United States Patent
Kopelman et al.

(10) Patent No.: US 12,502,252 B2
(45) Date of Patent: Dec. 23, 2025

(54) DIRECT FABRICATION OF ALIGNERS WITH INTERPROXIMAL FORCE COUPLING

(71) Applicant: ALIGN TECHNOLOGY, INC., San Jose, CA (US)

(72) Inventors: Avi Kopelman, Palo Alto, CA (US); John Morton, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 783 days.

(21) Appl. No.: 17/340,528

(22) Filed: Jun. 7, 2021

(65) Prior Publication Data
US 2021/0353388 A1 Nov. 18, 2021

Related U.S. Application Data

(63) Continuation of application No. 15/202,472, filed on Jul. 5, 2016, now Pat. No. 11,045,282.

(60) Provisional application No. 62/189,263, filed on Jul. 7, 2015.

(51) Int. Cl.
 *A61C 7/08* (2006.01)
 *B33Y 10/00* (2015.01)
 *B33Y 80/00* (2015.01)

(52) U.S. Cl.
 CPC .................. *A61C 7/08* (2013.01); *B33Y 10/00* (2014.12); *B33Y 80/00* (2014.12)

(58) Field of Classification Search
 CPC .................................... A61C 7/08; A61C 7/10
 See application file for complete search history.

(56) References Cited

U.S. PATENT DOCUMENTS

| | | |
|---|---|---|
| 5,820,368 A | 10/1998 | Wolk |
| 5,975,893 A | 11/1999 | Chishti et al. |
| 6,183,248 B1 | 2/2001 | Chishti et al. |
| 6,309,215 B1 | 10/2001 | Phan et al. |
| 6,386,864 B1 | 5/2002 | Kuo |
| 6,450,807 B1 | 9/2002 | Chishti et al. |
| 6,454,565 B2 | 9/2002 | Phan et al. |
| 6,471,511 B1 | 10/2002 | Chishti et al. |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,749,414 B1 | 6/2004 | Hanson et al. |
| 6,783,604 B2 | 8/2004 | Tricca |

(Continued)

FOREIGN PATENT DOCUMENTS

WO 2015040495 A2 3/2015

*Primary Examiner* — Edward Moran
(74) *Attorney, Agent, or Firm* — FORTEM IP LLP

(57) ABSTRACT

Polymeric shell appliances are provided in which the polymeric shell appliances are configured to provide one or more activation forces to facilitate tooth movement. In many embodiments, the appliances comprise interproximal engagement structures to provide activation forces to interproximal tooth surfaces. In many embodiments, the activation forces are arranged to provide a plurality of forces, including a force in a direction opposite to an intended direction of tooth movement. The polymeric shell appliances may comprise one or more tooth receiving cavities, in which each of the plurality of tooth receiving cavities is shaped and arranged to provide a counter moment of each of the plurality of teeth.

24 Claims, 28 Drawing Sheets

(56) References Cited

U.S. PATENT DOCUMENTS

| | | |
|---|---|---|
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,892,474 B2 | 2/2011 | Shkolnik et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,920,163 B2 * | 12/2014 | Farrell ................ A61F 5/566 |
| | | 433/6 |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,283 B2 | 6/2021 | Riley et al. |
| 2002/0192617 A1 | 12/2002 | Phan et al. |
| 2003/0190575 A1* | 10/2003 | Hilliard ................ A61C 7/08 |
| | | 433/6 |
| 2004/0058295 A1 | 3/2004 | Bergersen |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0037311 A1* | 2/2005 | Bergersen ............. B33Y 80/00 |
| | | 433/6 |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0099544 A1* | 5/2006 | Lai ........................ A61C 7/08 |
| | | 433/6 |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0191502 A1* | 7/2009 | Cao ....................... A61C 7/002 |
| | | 433/24 |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2013/0095446 A1* | 4/2013 | Andreiko ............... A61C 7/08 |
| | | 128/848 |
| 2014/0061974 A1 | 3/2014 | Tyler |
| 2014/0067334 A1 | 3/2014 | Kuo |
| 2014/0265034 A1 | 9/2014 | Dudley |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0265376 A1 | 9/2015 | Kopelman |
| 2015/0366637 A1 | 12/2015 | Kopelman et al. |
| 2015/0366638 A1 | 12/2015 | Kopelman et al. |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2017/0319296 A1 | 11/2017 | Webber et al. |
| 2018/0153648 A1 | 6/2018 | Shanjani et al. |
| 2018/0168776 A1 | 6/2018 | Webber |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0069975 A1 | 3/2019 | Cam et al. |
| 2019/0099129 A1 | 4/2019 | Kopelman et al. |

(56) References Cited

U.S. PATENT DOCUMENTS

| | | |
|---|---|---|
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0338067 A1 | 11/2019 | Liska et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

\* cited by examiner

DIRECT FABRICATION OF ALIGNERS WITH INTERPROXIMAL FORCE COUPLING

CROSS-REFERENCE

This application is a continuation of U.S. application Ser. No. 15/202,472, filed Jul. 5, 2016, now U.S. Pat. No. 11,045,282, issued Jun. 29, 2021, which claims the benefit of U.S. Provisional Application No. 62/189,263, filed Jul. 7, 2015, the disclosures of which are incorporated herein by reference in their entirety.

The subject matter of the following patent applications is related to the present application: U.S. application Ser. No. 15/202,342, filed Jul. 5, 2016, entitled "MULTI-MATERIAL ALIGNERS," which claims the benefit of U.S. Provisional Application No. 62/189,259, filed Jul. 7, 2015 and U.S. Provisional Application No. 62/189,282, filed Jul. 7, 2015; U.S. application Ser. No. 15/202,452, filed Jul. 5, 2016, entitled "DIRECT FABRICATION OF ALIGNERS FOR ARCH EXPANSION," which claims the benefit of U.S. Provisional Application No. 62/189,271, filed Jul. 7, 2015, and U.S. Provisional Application No. 62/189,301, filed Jul. 7, 2015; U.S. application Ser. No. 15/202,348, filed Jul. 5, 2016, entitled "DIRECT FABRICATION OF ATTACHMENT TEMPLATES WITH ADHESIVE," which claimed the benefit of U.S. Provisional Application No. 62/189,259, filed Jul. 7, 2015, and U.S. Provisional Application No. 62/189,282, filed Jul. 7, 2015; U.S. application Ser. No. 15/202,467, filed Jul. 5, 2016, entitled "DIRECT FABRICATION CROSS-LINKING FOR PALATE EXPANSION AND OTHER APPLICATIONS," which claims the benefit of U.S. Provisional Application No. 62/189,301, filed Jul. 7, 2015, and U.S. Provisional Application No. 62/189,271, filed Jul. 7, 2015; U.S. application Ser. No. 15/202,254, filed Jul. 5, 2016, entitled "SYSTEMS, APPARATUSES AND METHODS FOR DENTAL APPLIANCES WITH INTEGRALLY FORMED FEATURES," which claims the benefit of U.S. Provisional Application No. 62/189,291, filed Jul. 7, 2015, U.S. Provisional Application No. 62/189,312, filed Jul. 7, 2015, and U.S. Provisional Application No. 62/189,317, filed Jul. 7, 2015; U.S. application Ser. No. 15/202,299, filed Jul. 5, 2016, entitled "DIRECT FABRICATION OF POWER ARMS," which claims the benefit of U.S. Provisional Application No. 62/189,291, filed Jul. 7, 2015, U.S. Provisional Application No. 62/189,312, filed Jul. 7, 2015, and U.S. Provisional Application No. 62/189,317, filed Jul. 7, 2015; U.S. application Ser. No. 15/202,187, filed Jul. 5, 2016, entitled "DIRECT FABRICATION OF ORTHODONTIC APPLIANCES WITH VARIABLE PROPERTIES," which claims the benefit of U.S. Provisional Application No. 62/189,291, filed Jul. 7, 2015, U.S. Provisional Application No. 62/189,312, filed Jul. 7, 2015, and U.S. Provisional Application No. 62/189,317, filed Jul. 7, 2015; U.S. application Ser. No. 15/202,139, filed Jul. 5, 2016, entitled "SYSTEMS, APPARATUSES AND METHODS FOR SUBSTANCE DELIVERY FROM DENTAL APPLIANCE," which claims the benefit of U.S. Provisional Application No. 62/189,303, filed Jul. 7, 2015; U.S. application Ser. No. 15/201,958, filed Jul. 5, 2016, entitled "DENTAL MATERIALS USING THERMOSET POLYMERS," which claims the benefit of U.S. Provisional Application No. 62/189,380, filed Jul. 7, 2015; and U.S. application Ser. No. 15/202,083, filed Jul. 5, 2016, entitled "DENTAL APPLIANCE HAVING ORNAMENTAL DESIGN," which claims the benefit of U.S. Provisional Application No. 62/189,318, filed Jul. 7, 2015, the entire disclosures of which are incorporated herein by reference.

BACKGROUND OF THE INVENTION

Prior methods and apparatus for moving teeth can be less than ideal in at least some respects. Although transparent shell appliances can be effective in moving teeth, complex tooth movements may benefit from the use of attachments on the teeth that engage the appliance to move the tooth. Although attachments can be effective, the attachments on the teeth can be somewhat cumbersome for the patient. It would be helpful to move teeth with transparent shell appliances having fewer attachments.

SUMMARY

The methods and apparatus disclosed herein provide improved movement of teeth with interproximal engagement structures. The interproximal engagement structures can extend at least partially into the interproximal space of the teeth to engage the teeth. Interproximal engagement can allow engagement of increased amounts of the tooth surface with the appliance in order to provide more accurate tooth movement. Also, the interproximal engagement allows access to the tooth at locations that are beneficial for promoting tooth movement. In many embodiments, interproximal engagement of a tooth can be opposed with an engagement of the tooth at another location on an opposite side of the tooth in order to promote one or more of torque or rotation of the tooth. A tooth may be engaged interproximally on a first side and near an occlusal surface on a second side opposite the first side in order to induce the torque or rotation. The interproximal engagement can provide engagement closer to a center of rotation of the tooth than the location on the opposite side in order to induce the torque. In many embodiments, a pair of interproximal structures of an appliance is configured to engage a tooth on buccal and lingual interproximal surfaces in order to provide improved engagement and tooth-moving forces. The interproximal structures can be used to control rotation of a tooth in order to improve movement of the tooth, and also to provide improved anchoring. The interproximal structures can be used to anchor the appliance to posterior teeth such as molars, and to encourage movement of anterior teeth to close an extraction site with engagement of the anchored molars. Alternatively or in combination, the interproximal structures can also be used to treat diastema or induce a midline shift.

In many embodiments, an intraoral cavity of a patient is scanned to provide three dimensional profile data of the mouth of the patient. The three dimensional profile data of the tooth of the patient can be used to determine the three dimensional shape profile of the appliance having the interproximal structures. The appliance comprising the interproximal structures can be directly fabricated. The appliance may comprise one of a plurality of appliances to move the teeth in accordance with a treatment plan, and the locations of the interproximal structures can be determined in accordance with the treatment plan.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

Figure 1A:
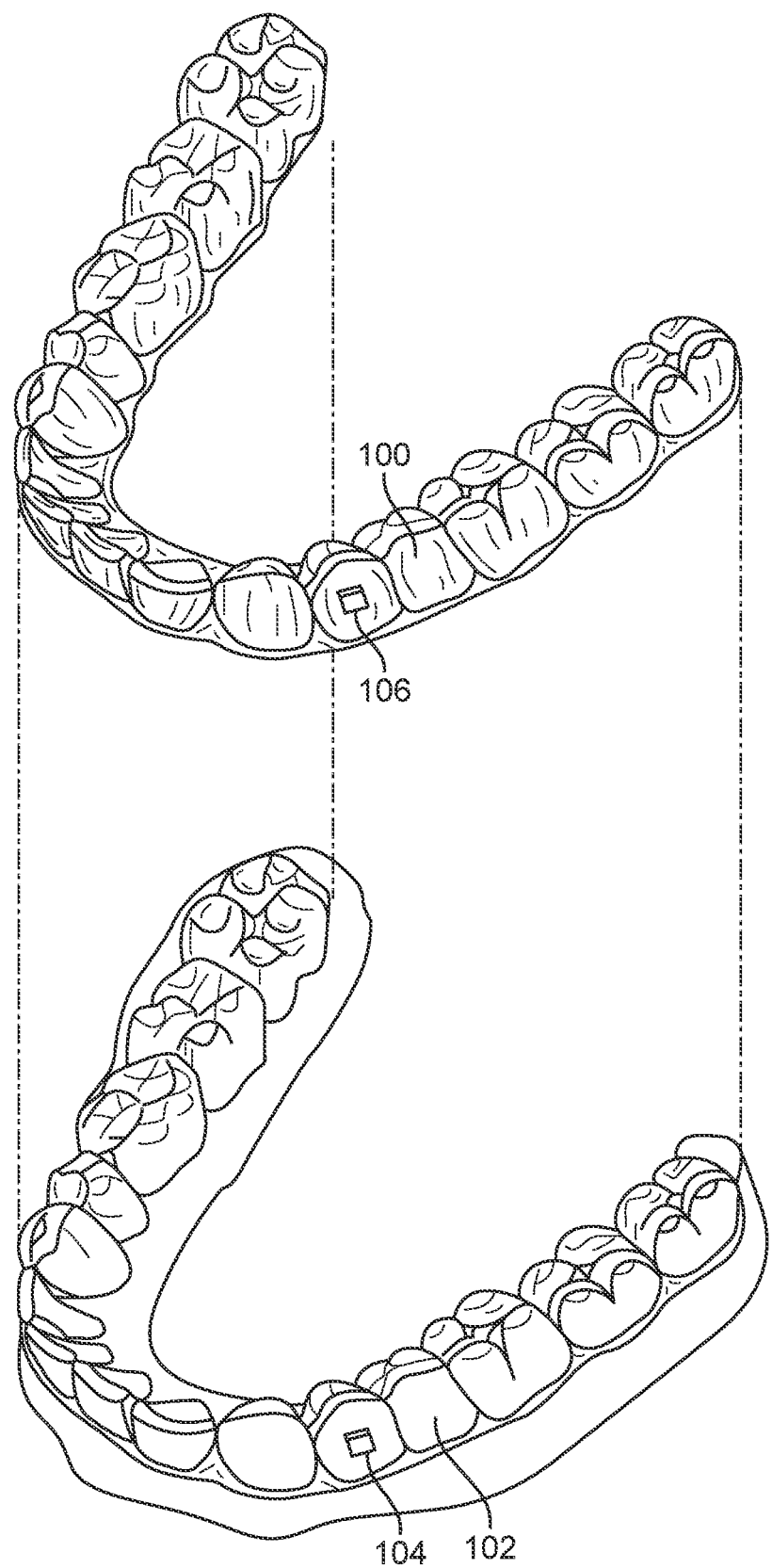
FIG. 1A illustrates a tooth repositioning appliance, in accordance with embodiments.

In many embodiments, a method of moving a tooth of a patient from a first position and orientation to a second position and orientation is provided. The method comprises providing a polymeric shell appliance shaped to fit a plurality of teeth. The polymeric shell appliance comprises a polymeric interproximal engagement structure sized to extend across an interproximal space of the tooth from a lingual side to a buccal side. The polymeric shell appliance also comprises one or more teeth receiving cavities to couple the tooth to one or more other teeth of the plurality with one or more other tooth receiving cavities. When worn, the interproximal engagement structure applies a force to the tooth from the interproximal space and moves the tooth from the first position and orientation to the second position and orientation.

In some embodiments, each of the interproximal engagement structures comprises a width extending between adjacent teeth defining the interproximal space, and wherein the width successively increases among the plurality of appliances in order to increase successively a distance between the adjacent teeth. In some embodiments, each of the interproximal engagement structures comprises opposing contact surfaces to engage adjacent teeth defining the interproximal space, and wherein angles of the contact surfaces relative to each other varies among the plurality of appliances in order to move the tooth from a first position and orientation to the second position and orientation.

In many embodiments, a method is provided for moving a tooth of a patient from a first position and orientation to a second position and orientation. A plurality of orthodontic appliances shaped to fit a plurality of teeth is provided in succession. Each of the plurality of orthodontic appliances comprises an interproximal engagement structure sized to extend across an interproximal space of the tooth from a buccal side of the tooth to a lingual side of the tooth and one or more teeth receiving structures coupled to the interproximal engagement structure in order to couple the tooth to one or more other teeth of the plurality. A location of the interproximal engagement structure relative to the one or more teeth receiving structures varies among the plurality of orthodontic appliances in order to move the tooth from the first position and orientation to the second position and orientation.

In some embodiments, for each of the plurality of appliances the one or more teeth receiving structures comprises one or more teeth receiving cavities and the interproximal engagement structure is located a distance from the one or more teeth receiving cavities. The distance varies among the plurality of orthodontic appliances.

In some embodiments, for each of the plurality of appliances the one or more teeth receiving structures is coupled to the interproximal engagement structure with one or more extensions extending between the interproximal engagement structure and the one or more teeth receiving structures in order to couple the interproximal engagement structure with a non-adjacent tooth.

In many embodiments, a method of moving teeth of a patient from first positions and orientations to second positions and orientations is provided. The method comprises successively providing a plurality of orthodontic appliances shaped to fit a plurality of teeth, each of the plurality of orthodontic appliances. The plurality of appliances each comprise a plurality of interproximal engagement structures sized to extend across interproximal spaces of the teeth from buccal sides of the teeth to lingual sides of the teeth, each of the plurality of engagement structures comprising an interproximal engagement surface to engage the teeth. Each of the plurality of appliances has a separation distance between the engagement surfaces, and the separation distance successively varies among the plurality of appliances in order to move the teeth from the first positions and orientations to the second positions and orientations when the plurality of appliances is worn in succession.

In some embodiments, the separation distance successively increases among the plurality of appliances. In some embodiments, the separation distance successively decreases among the plurality of appliances.

In some embodiments, for each of the plurality of interproximal engagement structures the separation distance is sized to receive one or more teeth between a first interproximal engagement structure and a second interproximal engagement structure.

In many embodiments, a method of moving teeth of patient from first positions and orientations to second positions and orientations is provided. The method comprises successively providing a plurality of orthodontic appliances shaped to fit the teeth. Each appliance comprises a plurality of interproximal engagement structures sized to extend a plurality of distances across interproximal spaces of the teeth from buccal sides of the teeth to lingual sides of the teeth. The plurality of distances successively decreases among the plurality of appliances in order to move the teeth from the first positions and orientations to the second positions and orientations when the plurality of appliances is worn in succession.

In some embodiments, the plurality of distances decreases in accordance with movement of the teeth, the movement comprising one or more of a translation or a rotation. In some cases, the plurality of distances can decrease in accordance with translation of one or more teeth; in some cases, the plurality of distances decreases in accordance with rotation of one or more teeth about a center of rotation.

In some embodiments, the plurality of distances successively decreases in accordance with successive rotations of one or more of the teeth about an axis of rotation extending through a center of rotation and an occlusal surface of the one or more teeth.

In many embodiments, a method of moving teeth of patient from first positions and orientations to second positions and orientations is provided. An orthodontic shell appliance shaped to fit a plurality of teeth is provided. The shell appliance comprises an outer wall extending over buccal and lingual surfaces of the plurality of teeth, respectively, and a plurality of interproximal engagement structures sized to extend across interproximal spaces of the teeth from buccal sides of the teeth to lingual sides of the teeth and couple to the outer wall on buccal and lingual sides of the wall. The plurality of interproximal engagement structures urges the buccal and lingual sides of the wall toward each other when placed on the plurality of teeth when the appliance is worn.

In some embodiments, the plurality of interproximal engagement structures extends a plurality of distances between the buccal and lingual sides of the wall in a free standing configuration prior to placement and a second plurality of corresponding distances in a loaded configuration when placed on the plurality of teeth, the first plurality of distances less than the second plurality of corresponding distances. In some embodiments, the wall is shaped to receive one or more teeth and wherein the wall engages the one or more teeth with force in order to move the one or more teeth in response to forces from the interproximal engagement structures.

In many embodiments, a method of moving a tooth of a patient from a first position and orientation to a second position and orientation is provided. An orthodontic appliance shaped to fit a plurality of teeth is provided. The appliance comprises an outer wall extending over buccal and lingual sides of the plurality of teeth when the appliance is worn, and an interproximal engagement structure sized to extend into an interproximal space between the tooth and an adjacent tooth when the appliance is worn. The interproximal engagement structure extends a distance from a contact surface engaging the tooth to an outer surface of the outer wall when the appliance is worn, the contact surface comprising a radius of curvature, wherein the radius of curvature is less than one third of the distance.

In some embodiments, the radius of curvature extends in a buccolingual direction to correspond to curvature of a surface of the tooth in the buccolingual direction. In some embodiments, the interproximal engagement structure comprises a second contact surface to engage the other tooth, the interproximal engagement structure extends a second distance from the second contact surface to the outer surface of the outer wall, the second contact surface comprising a second radius of curvature, and the second radius of curvature is less than one third of the second distance.

In some embodiments, the outer surface of the outer wall comprises a buccal surface of the appliance; in some embodiments, the outer surface of the outer wall comprises a lingual surface of the appliance.

In many embodiments, a method of moving a tooth of patient from a first position and orientation to a second position and orientation is provided. The method comprises providing a polymeric shell appliance shaped to fit a plurality of teeth. The appliance comprises an outer wall shaped to extend over exposed buccal, lingual and occlusal surfaces of the plurality of teeth when the appliance is worn and a plurality of interproximal engagement structures sized to extend into interproximal spaces of the teeth and couple to the outer wall on buccal and lingual sides of the wall when the appliance is worn. The polymeric shell appliance is configured to contact at least about 60% of the circumferential surfaces of the plurality of teeth when worn. In some embodiments, the appliance contacts at least about 80% of the circumferential surface of the plurality of the teeth when worn.

In many embodiments, a method of moving a tooth of a patient from a first position and orientation to a second position and orientation is provided, comprising successively providing a plurality of orthodontic appliances shaped to fit a plurality of teeth. Each of the plurality of orthodontic appliances comprises a wall shaped to receive the plurality of teeth and an interproximal engagement structure extending from the wall. The interproximal engagement structure is sized to fit into an interproximal space between adjacent teeth, and comprises a length extending from the wall into the interproximal space and a width extending in a mesio-distal direction between the adjacent teeth at a location between the adjacent teeth when the appliance is worn in the mouth of the patient. One or more of the length or the width of the interproximal engagement structure at the location varies among the plurality of orthodontic appliances in order to move the tooth from the first position and orientation to the second position and orientation when the plurality of appliances is worn in succession.

In some embodiments, each of the interproximal engagement structures comprises a contact surface to engage one or more of the teeth defining the interproximal space and wherein an angle of the contact surface varies among the plurality of appliances to move the one or more teeth from the first location to the second location. In some embodiments, each of the interproximal engagement structures comprises a contact surface having a length sized to engage one or more of the teeth defining the interproximal space and wherein the length of the contact surface varies among the plurality of appliances to vary an amount of force to the one or more teeth. In some embodiments, one or more of the wall or the interproximal engagement structure resiliently deforms or deflects in response to forces from the teeth.

In various embodiments, the interproximal engagement structure extends across the interproximal space at a location gingival to a minimum distance between the tooth and an adjacent tooth defining the interproximal space.

In various embodiments, at least one appliance comprises a plurality of materials.

In various embodiments, providing an orthodontic appliance comprises placing said appliance on the teeth of the patient. In various embodiments, the patient places the orthodontic appliance on the teeth.

In various embodiments, the tooth comprises a plurality of teeth.

In various embodiments, the interproximal engagement structure comprises one or more voids.

In many embodiments, a polymeric shell appliance is provided for moving a tooth of a patient from a first position and orientation to a second position and orientation. The polymeric shell appliance comprises a polymeric interproximal engagement structure sized to extend across an interproximal space of the tooth from a lingual side to a buccal side and one or more teeth receiving cavities to couple the tooth to one or more other teeth of the plurality with one or more other tooth receiving cavities. The interproximal engagement structure is shaped to apply a force to the tooth from the interproximal space and move the tooth from the first position and orientation to the second position and orientation when the appliance is worn.

In some embodiments, each of the interproximal engagement structures comprises a width extending between adjacent teeth defining the interproximal space, and wherein the width successively increases among the plurality of appliances in order to increase successively a distance between the adjacent teeth. In some embodiments, each of the interproximal engagement structures comprises opposing contact surfaces to engage adjacent teeth defining the interproximal space, and wherein angles of the contact surfaces relative to each other varies among the plurality of appliances in order to move the tooth from a first position and orientation to the second position and orientation.

In many embodiments, a plurality of orthodontic appliances is provided for moving a tooth of a patient from a first position and orientation to a second position and orientation. Each appliance comprises an interproximal engagement structure sized to extend across an interproximal space of the tooth from a buccal side of the tooth to a lingual side of the tooth and one or more teeth receiving structures coupled to the interproximal engagement structure in order to couple the tooth to one or more other teeth of the patient. A location of the interproximal engagement structure relative to the one or more teeth receiving structures varies among the plurality of orthodontic appliances in order to move the tooth from the first position and orientation to the second position and orientation when the plurality of appliances are worn in succession In some embodiments, for each of the plurality of appliances the one or more teeth receiving structures comprises one or more teeth receiving cavities and the interproximal engagement structure is located a distance from the one or more teeth receiving cavities. The distance varies among the plurality of orthodontic appliances.

In some embodiments, for each of the plurality of appliances the one or more teeth receiving structures is coupled to the interproximal engagement structure with one or more extensions extending between the interproximal engagement structure and the one or more teeth receiving structures in order to couple the interproximal engagement structure with a non-adjacent tooth.

In many embodiments, a plurality of orthodontic appliances is provided for moving teeth of patient from first positions and orientations to second positions and orientations. Each appliance comprises a plurality of interproximal engagement structures sized to extend across interproximal spaces of the teeth from buccal sides of the teeth to lingual sides of the teeth, each of the plurality of engagement structures comprising an interproximal engagement surface to engage the teeth. Each of the plurality of appliances has a separation distance between the engagement surfaces, and the separation distance successively varies among the plurality of appliances in order to move the teeth from the first positions and orientations to the second positions and orientations when the plurality of appliances are worn in succession.

In some embodiments, the separation distance successively increases among the plurality of appliances; in some embodiments, the separation distance successively decreases among the plurality of appliances.

In some embodiments, for each of the plurality of interproximal engagement structures the separation distance is sized to receive one or more teeth between a first interproximal engagement structure and a second interproximal engagement structure.

In many embodiments, a plurality of appliances is provided for moving teeth of patient from first positions and orientations to second positions and orientations. Each appliance comprises a plurality of interproximal engagement structures sized to extend a plurality of distances across interproximal spaces of the teeth from buccal sides of the teeth to lingual sides of the teeth. The plurality of distances successively decreases among the plurality of appliances in order to move the teeth from the first positions and orientations to the second positions and orientations when the plurality of appliances are worn in succession.

In some embodiments, the appliances are configured to produce a movement of the teeth when worn successively, the movement comprising one or more of a translation or a rotation, and wherein the plurality of distances decreases in accordance with movement of the teeth. In some cases, the appliances are configured to produce a translation of the teeth when worn successively, and wherein the plurality of distances decreases in accordance with translation of one or more teeth. In some cases, the appliances are configured to produce a rotation of the teeth when worn successively, and wherein the plurality of distances decreases in accordance with rotation of one or more teeth about a center of rotation.

In some embodiments, the appliances are configured to produce a rotation of the teeth when worn successively, and wherein the plurality of distances successively decreases in accordance with successive rotations of one or more of the teeth about an axis of rotation extending through a center of rotation and an occlusal surface of the one or more teeth.

In many embodiments, an orthodontic shell appliance is provided for moving a plurality of teeth of a patient from first positions and orientations to second positions and orientations. The appliance comprises a plurality of teeth receiving cavities, an outer wall coupled to the teeth-receiving cavities and extending over buccal and lingual surfaces of the plurality of teeth, respectively, and a plurality of interproximal engagement structures sized to extend across respective interproximal spaces of the plurality of teeth from buccal sides of the teeth to lingual sides of the teeth and couple to the outer wall on buccal and lingual sides of the wall. The plurality of interproximal engagement structures are configured to urge the buccal and lingual sides of the wall toward each other when placed on the plurality of teeth.

In some embodiments, the plurality of interproximal engagement structures extends a plurality of distances between the buccal and lingual sides of the wall in a free standing configuration prior to placement and a second plurality of corresponding distances in a loaded configuration when placed on the plurality of teeth, the first plurality of distances less than the second plurality of corresponding distances.

In some embodiments, the wall is shaped to receive one or more teeth and engage the one or more teeth with force in order to move the one or more teeth in response to forces from the interproximal engagement structures.

In many embodiments, an orthodontic appliance is provided for moving a tooth of a patient from a first position and orientation to a second position and orientation. The appliance comprises a plurality of teeth receiving cavities, an outer wall coupled to the teeth-receiving cavities and extending over buccal and lingual sides of the tooth, and an interproximal engagement structure sized to extend into an interproximal space between the tooth and an adjacent tooth. The interproximal engagement structure extends a distance from a contact surface engaging the tooth to an outer surface of the outer wall when the appliance is worn, the contact surface comprising a radius of curvature, wherein the radius of curvature is less than one third of the distance.

In some embodiments, the radius of curvature extends in a buccolingual direction to correspond to curvature of a surface of the tooth in the buccolingual direction.

In some embodiments, the interproximal engagement structure comprises a second contact surface to engage the other tooth, wherein the interproximal engagement structure extends a second distance from the second contact surface to the outer surface of the outer wall, the second contact surface comprising a second radius of curvature, wherein the second radius of curvature is less than one third of the second distance.

In some embodiments, the outer surface of the outer wall comprises a buccal surface of the appliance; in some embodiments, the outer surface of the outer wall comprises a lingual surface of the appliance.

In many embodiments, a polymeric shell appliance is provided for moving a tooth of patient from a first position and orientation to a second position and orientation. The appliance comprises a plurality of teeth receiving cavities an outer wall coupled to the teeth-receiving cavities and extending over exposed buccal, lingual and occlusal surfaces of the plurality of teeth, and a plurality of interproximal engagement structures sized to extend into interproximal spaces of the teeth and couple to the outer wall on buccal and lingual sides of the wall. The polymeric shell appliance contacts at least about 60% of the circumferential surfaces of the plurality of teeth. In some embodiments, the polymeric shell appliance contacts at least about 80% of the circumferential surfaces of the plurality of teeth.

In many embodiments, a plurality of orthodontic appliances is provided for moving a tooth of a patient from a first position and orientation to a second position and orientation. Each appliance comprises a wall shaped to receive the plurality of teeth and an interproximal engagement structure extending from the wall and sized to fit into an interproximal space between adjacent teeth. The interproximal engagement structure comprises a length extending from the wall into the interproximal space and a width extending in a mesiodistal direction between the adjacent teeth at a location between the adjacent teeth. One or more of the length or the width of the interproximal engagement structure at the location varies among the plurality of orthodontic appliances in order to move the tooth from the first position and orientation to the second position and orientation when the plurality of appliances are worn in succession.

In some embodiments, each of the interproximal engagement structures comprises a contact surface to engage one or more of the teeth defining the interproximal space and wherein an angle of the contact surface varies among the plurality of appliances to move the one or more teeth from the first location to the second location.

In some embodiments, each of the interproximal engagement structures comprises a contact surface having a length sized to engage one or more of the teeth defining the interproximal space and wherein the length of the contact surface varies among the plurality of appliances to vary an amount of force to the one or more teeth.

In some embodiments, one or more of the wall or the interproximal engagement structure comprises material to resiliently deform or deflect in response to forces from the teeth.

In various embodiments, the interproximal engagement structure extends across the interproximal space at a location gingival to a minimum distance between the tooth and an adjacent tooth defining the interproximal space.

In various embodiments, at least one appliance comprises a plurality of materials. In various embodiments, the appliance is configured to be manually removable by the patient. In various embodiments, the tooth comprises a plurality of teeth. In various embodiments, interproximal engagement structure comprises one or more voids.

In many embodiments, an appliance to move one or more teeth from a first position and orientation to a second position and orientation is provided, comprising a plurality of interproximal engagement structures to engage an interproximal space of a first tooth at a buccal side of the interproximal space and a lingual side of the interproximal space in order to urge the tooth in a first direction and an opposing engagement structure to urge the tooth in a second direction opposite the first direction to apply a torque to the tooth, the plurality of interproximal engagement structures located on the appliance to engage the interproximal space closer to the gingiva than the opposing engagement structure.

In many embodiments, an appliance to move one or more teeth from a first position and orientation to a second position and orientation is provided, comprising an interproximal engagement structure to engage an interproximal space of a first tooth in order to urge the tooth in a first direction and an opposing engagement structure to urge the tooth in a second direction opposite the first direction to apply a torque to the tooth, the plurality of interproximal engagement structures located on the appliance to engage the interproximal space closer to the gingiva than the opposing engagement structure.

In various embodiments, an appliance further comprises a plurality of interproximal structures on opposing sides of a second tooth to anchor the appliance to the second tooth while moving the first tooth.

In some embodiments, the second tooth comprises a plurality of anchor teeth and the plurality of interproximal engagement structures comprises a plurality of pairs of interproximal engagement structures to engage the plurality of anchor teeth. In some embodiments, the interproximal engagement structure comprises a plurality of interproximal engagement structures comprising a first interproximal engagement structure on a buccal side of the tooth and a second interproximal engagement structure on a lingual side. In some embodiments, the first tooth comprises a plurality of first teeth to be moved and the plurality of interproximal engagement structures comprises a plurality of pairs of interproximal engagement structures to engage the plurality of first teeth to be moved. In some embodiments, the first tooth comprises a plurality of first teeth to be moved and the interproximal engagement structure comprises a plurality of interproximal engagement structures to engage the plurality of first teeth to be moved.

In various embodiments, the appliance comprises a plurality of teeth-receiving cavities shaped to receive the teeth and move the one or more teeth from the first position and orientation to the second position and orientation.

In various embodiments, moving the one or more teeth comprises a translation of the one or more teeth. In various embodiments, moving the one or more teeth comprises a rotation the one or more teeth. In some embodiments, the rotation comprises a rotation about a vertical axis; in some embodiments, the rotation comprises a rotation a buccolingual axis.

In various embodiments, the plurality of interproximal engagement structures merge into a single engagement structure extending through an interproximal gap from a buccal side to a lingual side to engage the tooth on a buccal side and a lingual side.

In various embodiments, a method of moving a plurality of teeth with an appliance is provided, comprising providing an appliance as disclosed herein.

In many embodiments, method of manufacturing an orthodontic appliance to move one or more teeth of a patient is provided. A movement path is determined to move the one or more teeth from an initial arrangement to a target arrangement. A force system to produce movement of the one or more teeth along the movement path is determined. An appliance geometry is determined for an orthodontic appliance configured to produce the force system. The orthodontic appliance is directly fabricated based on the determined appliance geometry.

In some embodiments, the appliance geometry comprises at least one interproximal engagement structure configured to engage an interproximal space of a first tooth.

In some embodiments, the method further comprises manufacturing a plurality of orthodontic appliances, each of the plurality of orthodontic appliances configured to produce a movement along the movement path.

In various embodiments, an appliance as disclosed herein has been directly fabricated.

In some aspects, the direct fabrication comprises additive manufacturing. In some aspects, the direct fabrication comprises subtractive manufacturing.

As used herein the terms "stiff" and "rigid" are used interchangeably.

As used herein the terms "torque" and "moment" are treated synonymously.

As used herein the term "and/or" is used as a functional word to indicate that two words or expressions are to be taken together or individually. For example, A and/or B encompasses A alone, B alone, and A and B together.

As used herein a "plurality of teeth" encompasses two or more teeth.

As used herein a "moment" encompasses a force acting on an object such as a tooth at a distance from a center of resistance. The moment may be calculated with a vector cross product of a vector force applied to a location corresponding to a displacement vector from the center of resistance, for example. The moment may comprise a vector pointing in a direction. A moment opposing another moment may encompass one of the moment vectors oriented toward a first side of the object such as the tooth and the other moment vector oriented toward an opposite side of the object such as tooth, for example.

As used herein a "differential moment" encompasses two or more moments coupled to each other to provide opposing moments to one or more teeth. The differential moment may comprise a first moment and a second opposing moment applied to a tooth. Alternatively or in combination, the differential moment may comprise a first moment of a first one or more teeth of the arch coupled to a second, opposing moment of a second one or more teeth of the arch. The first one or more teeth of the arch may comprise a first segment of the arch and the second one or more teeth of the arch may comprise a second segment of the arch, in which the first moment of the first segment of the arch is coupled to the second, opposing moment of the second segment of the arch. The first one or more teeth may comprise a first plurality of adjacent teeth of the first segment of the arch, and the second one or more teeth may comprise a second plurality of adjacent teeth of the second segment of the arch, in which the first moment of the first plurality of adjacent teeth of the arch opposes the second, counter moment of the second plurality of adjacent teeth of the arch.

As used herein, a tooth comprising a moment refers to a tooth with a force acting on the tooth about a center of resistance. The force can be generated by an appliance coupled to the tooth, either directly or with an attachment on the tooth, and combinations thereof.

The counter moments as disclosed herein can be used to accurately control movement of one or more teeth, and can be used to provide anchoring of one or more teeth. In many embodiments, a plurality of posterior teeth comprise counter moments to improve anchoring of the posterior teeth, and one or more posterior teeth comprises a lesser counter movement and is moved toward the plurality of posterior anchor teeth. Alternatively, counter moments of one or more of the plurality posterior teeth can be configured to allow the one or more posterior teeth to move toward the anterior tooth.

The moments of a plurality of groups of one or more teeth can be coupled to each other in order to control movement of the teeth, and the moments of the one or more groups of teeth can be coupled to each other in many ways. The moments of the groups of one or more teeth can be coupled to each other with offset moments and/or balanced moments in order to provide preferential movement to one or more of the groups of one or more teeth. For example, posterior teeth can be provided with a larger counter moment than anterior teeth in order to move the anterior teeth to the posterior teeth.

The moments and counter moments as disclosed herein are well suited for moving many types of teeth and conditions of teeth, and are well suited for use with many conditions of teeth. The embodiments disclosed herein can be used to treat one or more of cant of an occlusal plane, to raise teeth on one side of the mouth and lower teeth on an opposite side of the mouth, en masse expansion of teeth along an arch, closure of an extraction site, intrusion, extrusion, rotation, tipping, and combinations thereof, for example.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The first group of teeth can be coupled to the second group of teeth in many ways, and in many embodiments the first group of one or more teeth comprises a first moment and a first counter moment, and the second group of one or more teeth comprises a second moment and a second counter moment. The first moment and the first counter moment may comprise a combined first moment and a combined first counter moment of the first group of one or more teeth, and the second moment and the second counter moment may comprise a combined second moment and a combined second counter moment of the second group of teeth. The combined first moment, combined first counter moment, combined second moment and combined second counter moment can be coupled to each other with the polymeric shell appliance in order to move the first group of one or more teeth or the second group of one or more teeth, and combinations thereof.

In many embodiments, each of the first group of one or more teeth comprises a first moment and a counter moment, and each of the second group of one or more teeth comprises a second moment and a second counter moment. The first moment can be generated with a first force to one or more of the first teeth at a first region or location of the first tooth and the counter moment generated with a counter force to the one of the first teeth at counter location. The second moment can be generated with a second force to one or more of the second teeth at a region of the second tooth and the counter moment generated with a counter force to the one of the second teeth at counter location.

The center of resistance of an individual tooth can be located near the bifurcation or trifurcation of the root of the tooth, for example. For a single rooted tooth, the center of resistance can be located somewhere between about 25% and about 70% of the distance from the alveolar crest to the apex of the root, for example about 40% of the distance.

The center of resistance of a group of a segment of teeth comprising a plurality of teeth can be determined in one or more of many ways. The center of resistance can be determined with finite element modeling, published values in the scientific literature, bench testing with experimental loads, mathematical formula and approximations, and combinations thereof, for example. The center of resistance can be determined in response to supporting dental structures such as the periodontal ligaments, soft tissue, and bony supporting structures, for example. Although the center of resistance of a group of teeth may change with the direction of movement, a person of ordinary skill in the art can determine the center of resistance in accordance with embodiments disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or more known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation. Embodiments disclosed herein can provide differential moment vectors based on a moment and a counter moment to each of a plurality of teeth. The differential moment vector can provide improved accuracy of movement of the teeth and may result in decreased amounts of force to move one or more teeth.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication as described herein, for example. Alternatively or in combination, the appliance can be fabricated with machining such as an appliance fabricated from a block of material with computer numeric control machining.

Orthodontic systems of the present disclosure can include tooth attachments and one or more orthodontic appliances that engage the attachments when worn by a patient. Appliances having teeth receiving cavities that receive and reposition teeth, e.g., via application of force due to appliance resiliency, are generally illustrated with regard to FIG. 1A. FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
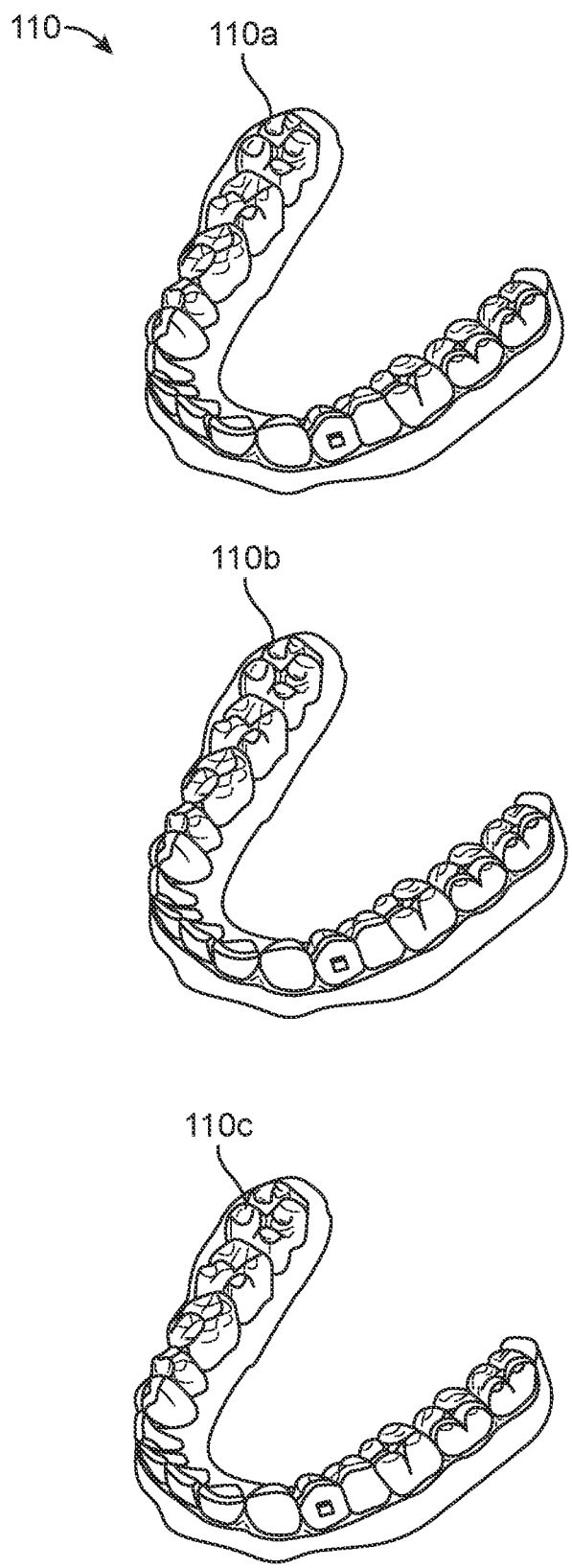
FIG. 1B illustrates a tooth repositioning system, in accordance with embodiments.

FIG. 1B illustrates a tooth repositioning system 110 including a plurality of appliances 110a, 110b, 110c. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 110a corresponding to an initial tooth arrangement, one or more intermediate appliances 110b corresponding to one or more intermediate arrangements, and a final appliance 110c corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
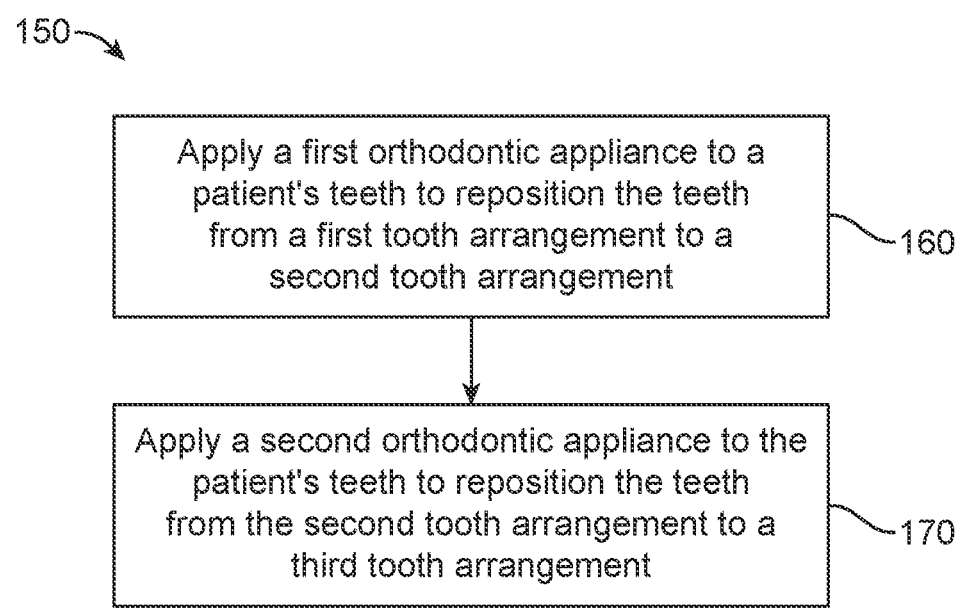
FIG. 1C illustrates a method of orthodontic treatment using a plurality of appliances, in accordance with embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object (e.g., an appliance shell) can be formed from a first material in accordance with any of the direct fabrication methods herein, then a second portion of the object (e.g., one or more elastics) can be formed from a second material in accordance with methods herein, and so on, until the entirety of the object has been formed. The relative arrangement of the first and second portions can be varied as desired, e.g., the first portion can be partially or wholly encapsulated by the second portion of the object.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Orthodontic appliances, such as illustrated in FIG. 1A, impart forces to the crown of a tooth and/or an attachment positioned on the tooth at each point of contact between a tooth receiving cavity of the appliance and received tooth and/or attachment. The magnitude of each of these forces and their distribution on the surface of the tooth determines the type of orthodontic tooth movement which results. Types of tooth movements are conventionally delineated as extrusion, intrusion, rotation, tipping, translation and root movement. Tooth movement of the crown greater than the movement of the root is referred to as tipping. Equivalent movement of the crown and root is referred to as translation. Movement of the root greater than the crown is referred to as root movement.

Tooth movements may be in any direction in any plane of space, and may comprise one or more of rotation or translation along one or more axes.

Figure 2:
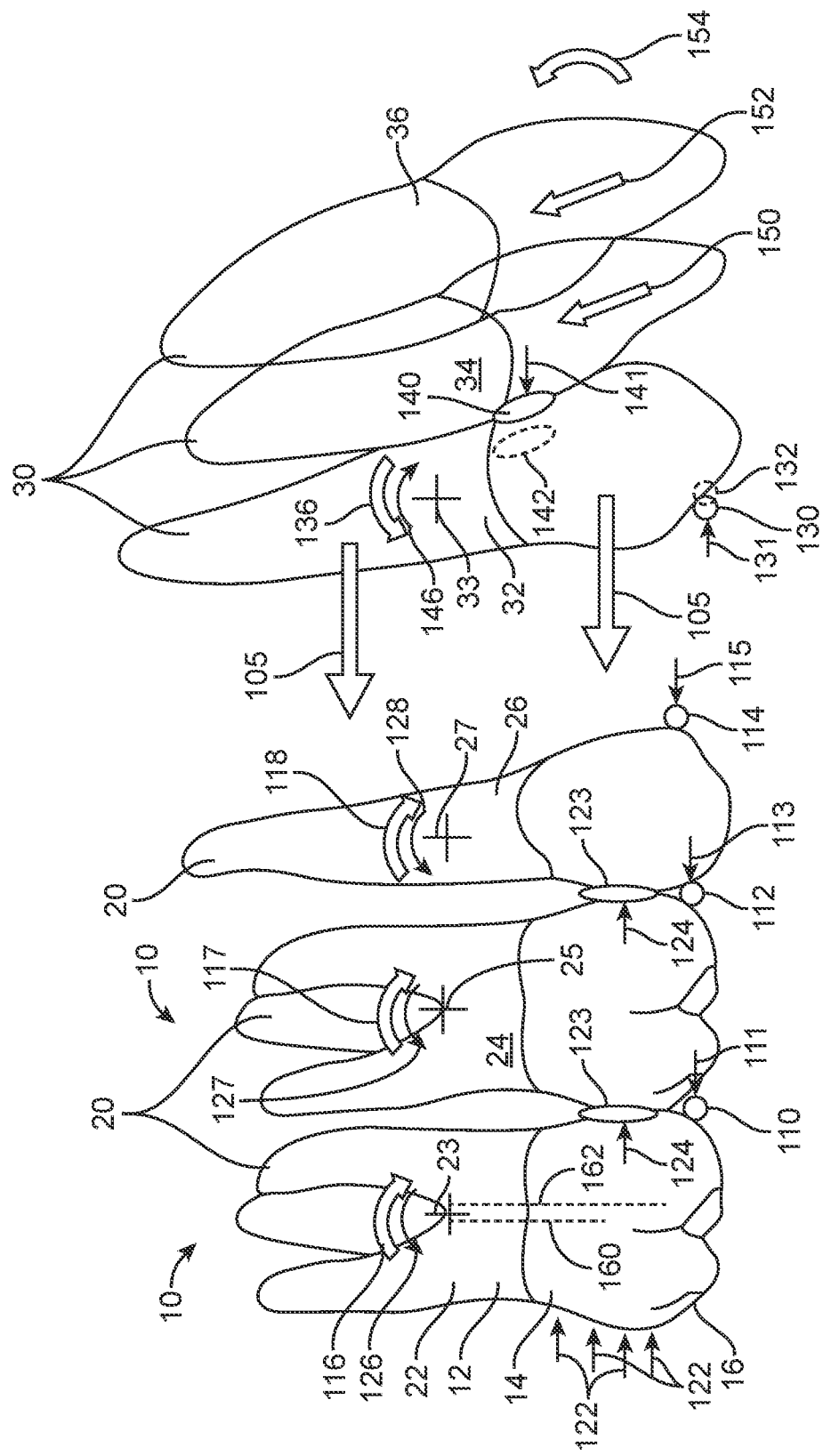
FIG. 2 shows components of an alignment apparatus and corresponding forces, in accordance with embodiments.

FIG. 2 shows components of an alignment apparatus 100 and corresponding forces. The alignment apparatus 100 may comprise one or more of the polymeric shell appliances configured and arranged to provide teeth moving forces as described herein. Each tooth of the plurality of teeth 10 comprises a root 12 and a crown 14, and the polymeric appliance can apply forces to the crown on the crown in order to move each tooth. The forces applied in this way may be combined with, or applied in alternative to, or in addition to, the forces that may be applied by the action of a polymeric shell on tooth attachments, as disclosed in Provisional Patent No. 62/099,965, incorporated herein by reference in its entirety. Each tooth of the plurality of teeth can move with respect to a center of resistance.

The plurality of teeth 10 may comprise two or more of any teeth of the mouth. The plurality of teeth 10 may comprise one or more of a plurality of posterior teeth 20 such as a plurality of molars or bicuspids and combinations thereof. The plurality of posterior teeth 20 may comprise one or more of a bicuspid 26, a first molar 24 or a second molar 22, for example. The plurality of posterior teeth may comprise a third molar comprising a wisdom tooth, for example. Alternatively or in combination, the plurality of teeth 10 may comprise one or more of a plurality of anterior teeth 30. The plurality of anterior teeth may comprise one or more of a bicuspid, a cuspid (canine), or incisor, for example. In many embodiments, the plurality of anterior teeth 30 comprises a cuspid 32, (canine) and one or more adjacent incisors, such as incisor 34 and incisor 36.

Many embodiments as disclosed herein are particularly well suited for closing extraction sites, such as an extraction site between the posterior teeth 20 and the anterior teeth 30. In many embodiments one or more teeth are moved to fill an extraction site with a movement in a target direction 105. Although the target direction 105 can extend in any direction, in many embodiments the target direction 105 extends along a sagittal direction (e.g., along a mesial-distal direction). The amount of tipping and/or counter rotation can be controlled with the size and shape of the appliance, engagement structures of the appliance, in order to direct movement of the tooth with appropriate amounts of force.

In many embodiments, each tooth comprises a center of resistance to forces applied to the tooth, and the tooth may rotate about the center of resistance, or approximately rotate in three dimensions about the center of resistance. The first molar 24 may comprise a center of resistance 25 located near the trifurcation of the roots. The second molar 22 may comprise a center of resistance 23 located near the trifurcation of the roots. The bicuspid 26 may comprise a center of resistance 27, for example. The cuspid 32 may comprise a center of resistance 33. Each of the incisor 34 and the incisor 36 may comprise a center of resistance. The location of each of the centers of resistance of the plurality of teeth as described herein may correspond to a center of resistance known to a person of ordinary skill the art.

The application of force to a tooth in order to move the tooth can result in a moment to the tooth about the center of resistance. In many embodiments, a target tooth to be moved such as cuspid 32 receives a force from the polymeric shell appliance, which can be a direct force from the surface of the interior of the shell or indirect through an attachment and combinations thereof. Direct fabrication of the polymeric shell allows the formation of an interproximal tooth engagement structure on the shell, such that when worn, the engagement structure contacts the tooth at an interproximal engagement location 140. Depending on the size of interproximal gap, such as that between teeth 32 and 34, the interproximal tooth engagement structure may extend through the interproximal region, or it may comprise more than one structure, located in similar positions on the lingual and buccal sides of the interproximal gap, respectively.

The use of direct fabrication techniques allows the formation of interproximal structures extending across the interproximal gap from the lingual to the buccal side, and such structures can have a thickness much smaller than possible using prior techniques, such as thermoforming. For example, an interproximal engagement structure can fabricated with a thickness of about 0.75 mm or less, about 0.45 mm or less, about 0.20 mm or less, about 0.1 mm or less, about 0.07 mm or less, or even about 0.05 mm or less at its narrowest point, allowing the structure to extend through a correspondingly small interproximal gap. Any of a variety of materials can be used to form such structures, depending on the forces desired; for example, the interproximal engagement structure can comprise an elastic material when force is to be applied over a distance to move a tooth, and the interproximal engagement structure can comprise stiff material when larger forces are desired. The material can match the material of an appliance shell, or differ, according to the chosen manufacturing technique.

The interproximal engagement structure can also be shaped to change thickness to match the shape of the interproximal gap, becoming narrow at its narrowest point and remaining thicker elsewhere. The contact surface of an interproximal engagement structure can be shaped to conform to the engaged teeth, allowing a broadly-distributed force to be applied. In some cases, an interproximal gap may initially be too small, but be enlarged during treatment to allow an interproximal engagement structure to extend through from the lingual to the buccal side. For example, a first appliance can be fabricated with interproximal engagement structures on one or both sides of an interproximal gap to apply a force when the gap is extremely narrow, and a second appliance can be fabricated with an interproximal engagement structure that extends through the interproximal gap once it is widened, thereby allowing the application of force across the interproximal tooth surface. Conversely, the reverse process can also be performed, in which an interproximal gap is narrowed, with a first interproximal engagement structure extending through the gap and a second structure extending into but not through the gap once narrowed.

Engagement location 140 can be varied to contact the tooth 32 in order to direct the tooth 32 with a planned movement. Engagement between the tooth 32 and the engagement structure of polymeric shell appliance 11 at location 140 can result in a force vector to on the tooth at location 140 as indicated with arrow 141. The shape and position of the engagement structure at location 140 can be chosen to customize the location, magnitude, and distribution of force 141. As tooth 32 resists forces with a center of resistance 33, a moment 146 about the center of resistance can result. The moment 146 can result in rotation of tooth 32.

In many embodiments, force may be applied to a tooth to generate a counter moment, such that the movement of a tooth is provided with a differential moment between the first moment and the second moment. A counter moment 136 can be provided with a tooth engagement structure fabricated on polymeric shell appliance 11, contacting the tooth at a location 130 located near the occlusal portion of the tooth. Alternatively or additionally, an attachment on the tooth may be engaged by contacting the polymeric shell appliance 11. The contact between the engagement structure and the tooth at location 130 generates a force vector as shown with arrow 131, opposite the force vector of at location 140 shown with arrow 141. The shape and position of the engagement structure at location 130 can be chosen to customize the location, magnitude, and distribution of force 131.

In many embodiments, the location chosen to generate the counter moment is located farther away from the center of resistance than the locus of engagement of the attachment or crown surface that urges the target tooth in the target direction, such that the force vector in the target direction is greater than the counter force in the opposite direction in order to generate the differential moment and urge the target tooth in the target direction. In many embodiments, an engagement structure that contacts the tooth at location 140 that urges the tooth 32 in target direction 105 is located closer to the center of resistance 33 and gingiva than the counter force location 130, such that counter moment 136 can approximate moment 146 in order to control rotation of tooth 32 as the tooth moves along target direction 105. For example, counter moment 136 can be less than moment 146 to allow the tooth to tip with rotation in the target direction 105, greater than moment 146 in order to rotate the crown away from target direction 105, or similar to moment 146 in order to maintain an orientation of tooth 32 when the tooth moves along target direction 105. In many embodiments, the appliance 11 comprising the polymeric shell comprises engagement structures to engage the tooth, or to engage attachments on the tooth, and the locations and shapes of the engagement structures can be arranged to provide suitable amounts of counter forces in order to provide counter moments to direct tooth movement along a target path.

In many embodiments, moment 136 opposes moment 116, moment 117 and moment 118, for example. Moments 116, 117 and 188 are similarly oriented as shown. With a right handed triple coordinate system, moment 136 will be oriented toward one side of the plurality of teeth (outward from the page toward the view) and moment 116, moment 117, and moment 118 will be similarly oriented (inwardly from the page away from the viewer) toward an opposite side of the teeth from moment 136. For example, moment 136 can be oriented toward a buccal side of the group of teeth, and moment 116, moment 117, and moment 118 can be similarly oriented toward a lingual side of the group of teeth.

In many embodiments, the force and counter force on a tooth may be induced by fabricating a polymeric shell wherein the engagement structures have rest positions different from the positions they occupy when engaged with a tooth. For example, an appliance may be fabricated such that occlusal and interproximal engagement structures have rest positions corresponding to locations 132 and 142 respectively, but are deflected by contact with the tooth to locations 130 and 140 when the appliance is worn by the patient. The deflection of engagement structures from rest positions may be enabled in some embodiments by using a plurality of materials, wherein the engagement structures may comprise a stiff polymeric materiel and a portion of the polymeric shell appliance connecting the two structures may comprise an elastic polymeric material. The potential energy imparted in the elastic polymeric material as the engagement structures are deflected from their rest positions may then be used to cause force 141 and counter force 131. By choice of polymeric materials, shapes and locations of the engagement structures as well as the portion of the polymeric shell appliance 11 connecting the structures, the magnitude, direction, location and distribution of force on each surface of the tooth can be independently customized.

One or more of the plurality of posterior teeth 20 can be configured with differential moments in order to control orientation of the one or more teeth. In many embodiments, counter moments of posterior teeth are arranged to inhibit movement of the posterior teeth. Work in relation to embodiments suggests that rotating the crown of the tooth away from a force to move a neighboring tooth can inhibit movement of the tooth, and rotation of a crown of a tooth toward a force from a neighboring tooth can facilitate movement of the tooth toward the neighboring tooth. In many embodiments, the plurality of posterior teeth 20 comprises a block of adjacent teeth configured to anchor the appliance and move the target tooth with little or no movement of the plurality of adjacent anchor teeth. Alternatively or in combination, one or more of the plurality of posterior teeth 20 can be configured to move toward the target tooth, for example.

In many embodiments, a large differential moment is provided between a group of one or more posterior teeth and a group of one or more the anterior teeth in order to anchor the posterior teeth. The counter moment of the posterior teeth can be greater than the counter moment of the anterior teeth in order to anchor the posterior teeth, for example to provide maximum anchorage to the posterior teeth.

In many embodiments, differential moments are provided between groups of teeth as described herein in order to provide tooth movement with improved control. In many embodiments, a first group of teeth comprises a first moment and a second group of teeth comprises a second moment, and a differential moment between a first moment of the first group of teeth and a second moment of the second group of teeth allows selective movement of the anterior and posterior teeth.

The polymeric shell appliance can be configured to couple groups of one or more teeth to each other in many ways. For example, a first group of one or more teeth can be coupled to a second group of one or more teeth. In many embodiments, the first group of one or more teeth comprises a first plurality of teeth, and the polymeric shell appliance comprises a shape to generate the first counter moment with each of the first plurality of adjacent teeth, in which the first counter moment comprises a combination of similarly oriented moments from said each of the first plurality of adjacent teeth as shown and described herein, for example with reference to FIG. 2. The second group of one or more teeth may comprise a second plurality of teeth and the polymeric shell appliance may comprise a shape to generate the second counter moment with each of the second plurality of adjacent teeth, in which the second counter moment comprises a combination of similarly oriented moments from said each of the second plurality of adjacent teeth.

In many embodiments, a tooth comprising a moment comprises a tooth with a force applied from an appliance to generate a moment or counter moment about the center of resistance. A group of teeth comprising a moment or a counter moment may comprise an appliance engaging one or more of the teeth to provide the moment or counter moment about the center of resistance.

In many embodiments, the plurality of tooth receiving cavities is shaped and arranged to balance the differential moment between the first one or more teeth and the second one or more teeth with the polymeric appliance extending between the first group of one or more teeth and the second group of one or more teeth. Alternatively or in combination, the plurality of tooth receiving cavities can be shaped and arranged to balance the first counter moment and the second counter moment between the first one or more teeth and the second one or more teeth.

In many embodiments, a posterior-most tooth comprises a substantial exposed surface 16 suitable for engagement with the polymeric appliance. The polymeric shell appliance 11 can generate force along the posterior surface of the crown at a locus of engagement as indicated with arrows 122. Alternatively or additionally, interproximal tooth engagement structures may be fabricated to engage teeth at one or more interproximal locations 123 to provide interproximal forces 124. The anteriorly directed force indicated with arrows 122 and/or arrows 124 generates a moment 126 about the center of resistance 23 of second molar 22, for example. In many embodiments, the force of the appliance indicated with arrows 122 and/or arrows 124 generates a moment 127 around the center of resistance 25 of first molar 24, and a moment 128 about the center of resistance 27 of the bicuspid 26, for example. One or more of the plurality of posterior teeth may contact engagement structures at locations such as 110, 112, or 114 to generate a counter moment. Alternatively, structures to cause these counter moments may be omitted, due to the relatively smaller effect of moments 126, 127, and 128.

In many embodiments, a counter moment is provided with a group of one or more teeth, for example with a plurality of posterior teeth. The counter moment may comprise a sum of the counter moments of each tooth of the group of teeth. The combined counter moment may comprise a counter moment about a combined center of resistance away from the center of resistance of each of the teeth of the group. A person of ordinary skill in the art can determine a center of resistance for a group of teeth with one or more known ways and in accordance with the embodiments disclosed herein.

The contact between a tooth engagement structure and the tooth at location 110 can generate a counter force as indicated with arrow 111 opposite the force indicated with arrows 122 in order to generate a counter moment 116. The counter moment 116 can be greater than moment 126, such that the crown of second molar 22 is rotated away from first molar 24, for example with the differential moment resulting from the sum of moment 126 with counter moment 116. Alternatively, counter moment 116 can be less than moment 126 and also inhibit rotation of second molar 22 toward first molar 24.

The moment and counter moment of each tooth can be determined based on the amount of force applied to the tooth and the distance from the center of resistance to the location of the force along the elongate axis of the tooth. The force shown with arrows 122 is applied at distance 160 along the elongate axis of the tooth from the center of resistance 23. The counter force shown with arrow 111 is applied at a distance 162 from the center of resistance 23. In many embodiments, the moment 126 approximately equals the product of the distance 160 and the force represented by arrows 122. The counter moment 112 approximately equals the product of distance 162 and the counter force on attachment 110 represented by arrow 111. A person of ordinary skill in the art will recognize may ways to determine the moments as described herein, for example with finite element modeling and integrating the moments at a plurality of positions relative to the center of resistance along the tooth.

The contact between a tooth engagement structure and the tooth at location 112 can generate a counter force as indicated with arrow 113 opposite the force indicated with arrows 122 in order to generate a counter moment 117. The counter moment 117 can be greater than moment 127, such that the crown of first molar 24 is rotated away from bicuspid 26, for example with the differential moment resulting from the sum of moment 127 with counter moment 117. Alternatively, counter moment 117 can be less than moment 127 and also inhibit rotation of first molar 24 toward bicuspid 26.

The contact between a tooth engagement structure and the tooth at location 114 can generate a counter force as indicated with arrow 115 opposite the force indicated with arrows 122 in order to generate a counter moment 118. The counter moment 118 can be greater than moment 128, such that the crown of bicuspid 26 is rotated away from the target tooth comprising cuspid 32, for example with the differential moment resulting from the sum of moment 128 with counter moment 118. Alternatively, counter moment 118 can be less than moment 128 and also inhibit rotation of bicuspid 26 toward the target tooth comprising cuspid 32.

Although reference is made to a plurality of posterior teeth as an anchoring block with counter moments, in many embodiments, the plurality of posterior teeth can be configured as an anchoring block without counter rotation and counter moments and without attachments in order to move one or more target teeth with the polymeric shell coupled to the plurality of posterior teeth and the one or more target teeth.

In many embodiments, movement of one or more teeth along a target vector can result in movement of one or more adjacent teeth. In many embodiments, movement of cuspid 32 toward the extraction site can result in extrusion of one or more adjacent incisors, for example incisor 34 and incisor 36. In many embodiments, polymeric shell appliance 11 is configured to provide one or more activation forces to one or more teeth. The polymeric shell appliance 11 can be configured with activation of the polymeric shell to apply an activation force 150 to incisor 34. In many embodiments, the activation force 150 is not sufficient to intrude incisor 34 with incisor 34 in the target position, and activation force 150 is sufficient to inhibit extrusion of incisor 34. Extrusion of incisor 34 with movement of cuspid 32 can result in an increased deflection of appliance 11 and increased activation force 150 in order to inhibit further extrusion of incisor 34. Similarly, the polymeric shell appliance can apply an activation force 152 and moment 154 to incisor 36 to inhibit extrusion and tipping of incisor 36.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

In step 230, an appliance geometry for an orthodontic appliance configured to produce the force system is determined. The geometry may comprise one or more tooth engagement structures, and the tooth engagement structures may be configured to engage the surface of at least one tooth. The tooth surface chosen from engagement may be an interproximal surface, a buccal or lingual surface, an occlusal surface, or any other surface of the tooth, depending on the characteristics of the force on the tooth it is to elicit. The geometry may also comprise a specification of material as a function of location within the orthodontic appliance, for example, specifying certain portions to comprise elastic polymeric material and other portions to comprise rigid polymeric material.

Determination of the appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA Optionally, one or more appliance geometries can be selected for testing or force modeling. As noted above, a desired tooth movement, as well as a force system required or desired for eliciting the desired tooth movement, can be identified. Using the simulation environment, a candidate appliance geometry can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance having the appliance geometry are generated. The instructions can be configured to control a fabrication system or device in order to produce the orthodontic appliance with the specified appliance geometry. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3A:
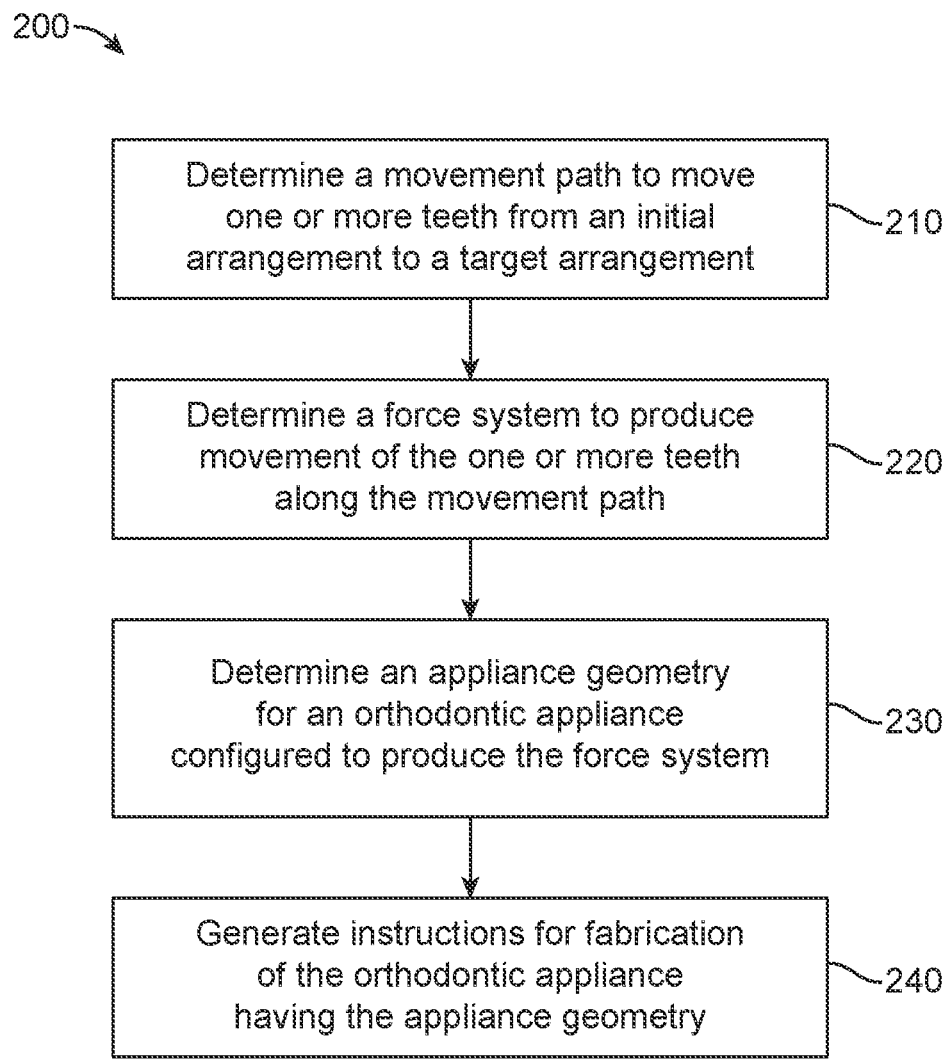
FIG. 3A illustrates a method for designing an orthodontic appliance, in accordance with embodiments
Figure 3B:
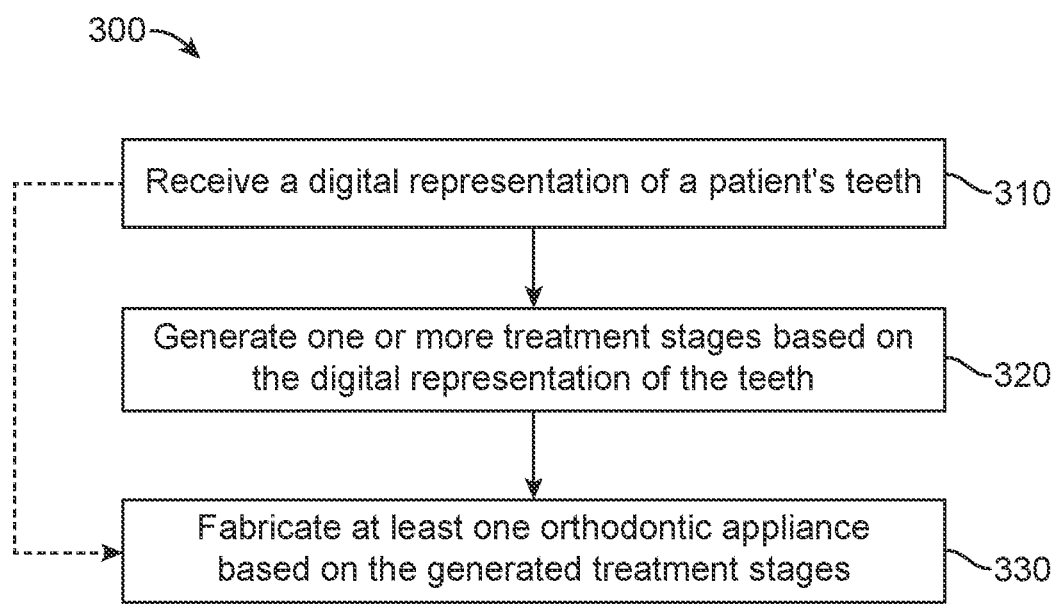
FIG. 3B illustrates a method for digitally planning an orthodontic treatment, in accordance with embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

Figure 4:
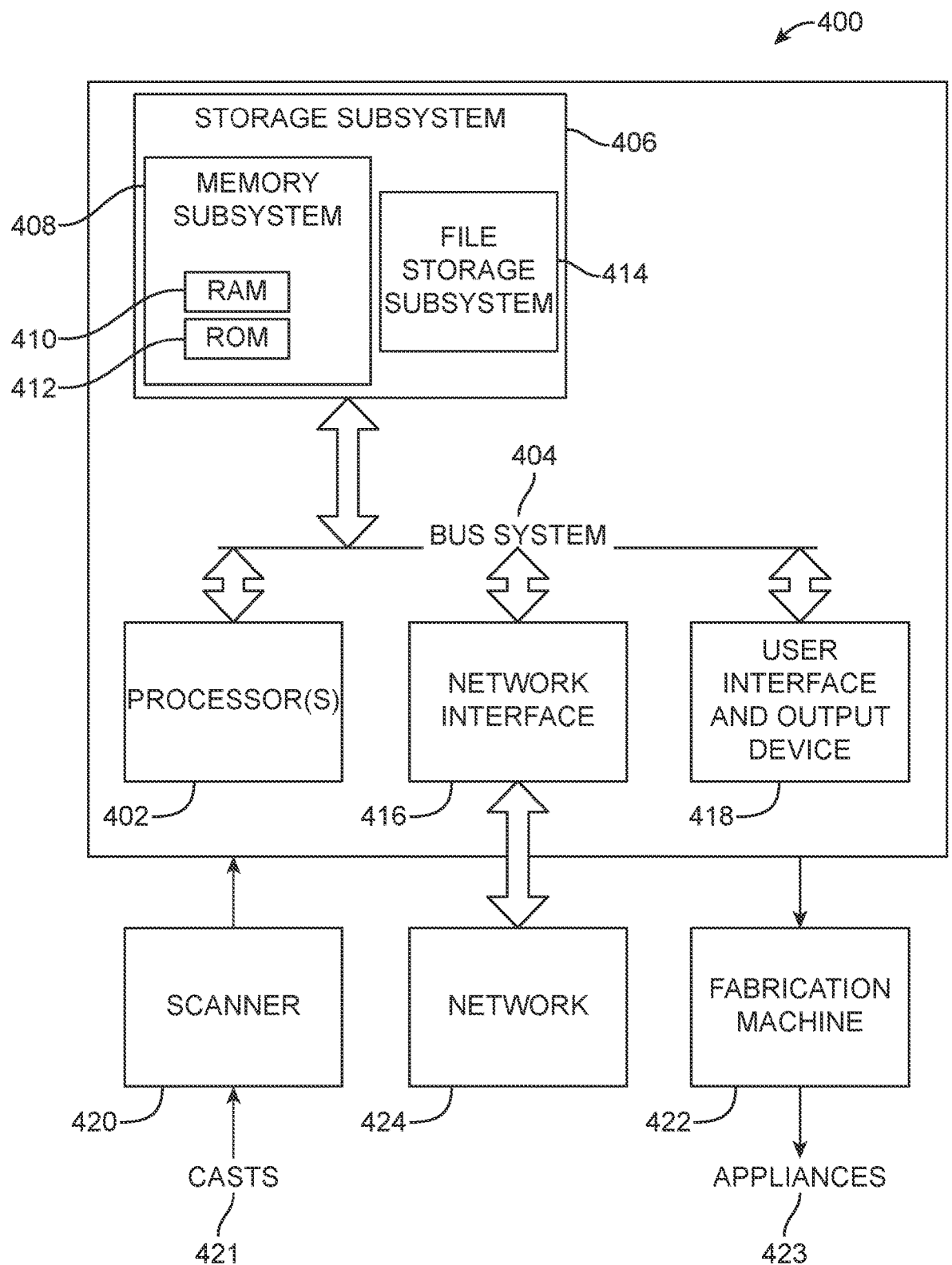
FIG. 4 is a simplified block diagram of a data processing system, in accordance with embodiments.

FIG. 4 is a simplified block diagram of a data processing system 400 that may be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 420 includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 may be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

The ability to directly fabricate appliance shells enables the production of a wide range of structures, allowing a tailoring of orthodontic forces to teeth in a variety of ways. FIGS. 5A-5E illustrate a variety of ways in which appliance shells may be fabricated in order to engage with tooth surfaces.

Figure 5A:
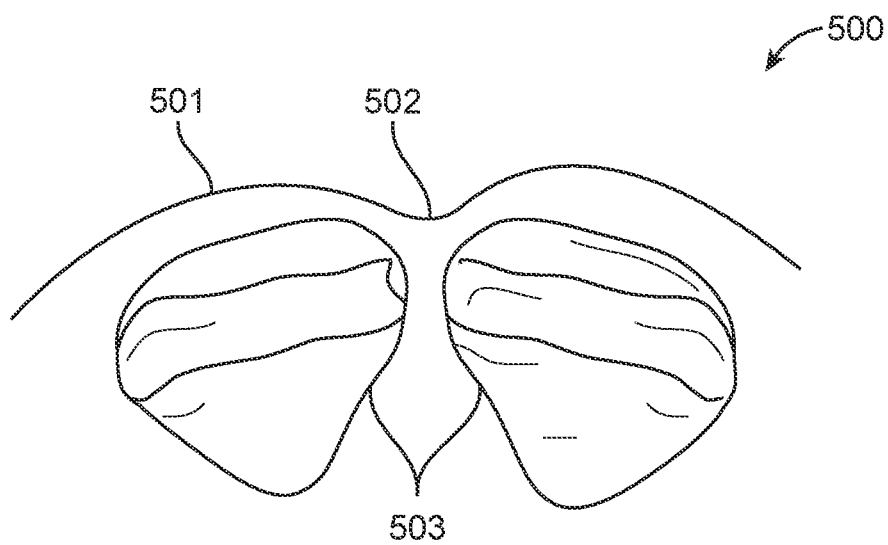
FIG. 5A illustrates an engagement mechanism between a fabricated shell and teeth 503, in accordance with embodiments.

FIG. 5A illustrates an engagement mechanism 500 between a fabricated shell 501 and teeth 503. The fabricated shell 501 has an interproximal tooth engagement structure 502, which is fabricated to fit in the interproximal region between teeth 503. As interproximal tooth engagement structure 502 and teeth 503 come into contact, a force may be transmitted from shell 501 to teeth 503. This force may provide an orthodontic force on one or both of teeth 503, which may result in tooth motion in a desired direction.

Figure 5B:
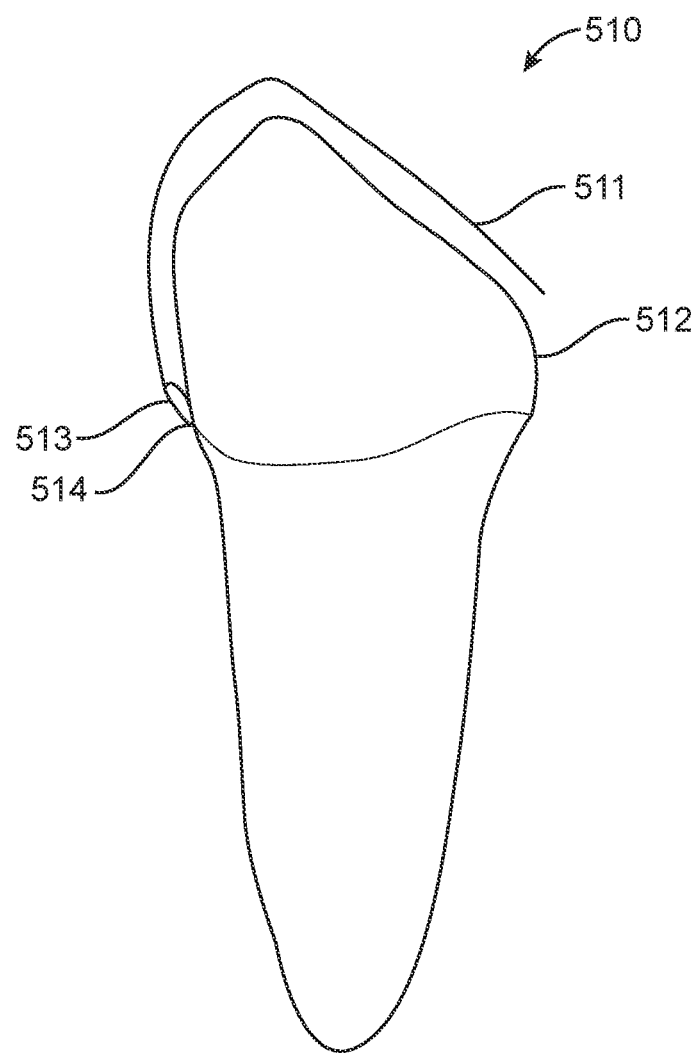
FIG. 5B illustrates another engagement mechanism between a fabricated shell 511 and a tooth, in accordance with embodiments.

FIG. 5B illustrates another engagement mechanism 510 between a fabricated shell 511 and a tooth 512. Shell 511 is fabricated with a tooth engagement structure 513 that is configured to engage an undercut 514 on the gingival portion of the tooth 512. The engagement structure 513 may be fabricated, for example, with a greater thickness than other parts of the shell 511 or be made of a different material than the shell 511, in order to further customize the force it can impose by contacting the undercut 514. Among the forces that may be applied on the tooth 512 by the contact force between the engagement structure 513 and the undercut 514 is an extrusive force, which may be applied by applying a force in the occlusal direction on shell 511, which may be balanced by a force in the gingival direction due to the contact between the shell 511 and one or more other teeth.

Figure 5C:
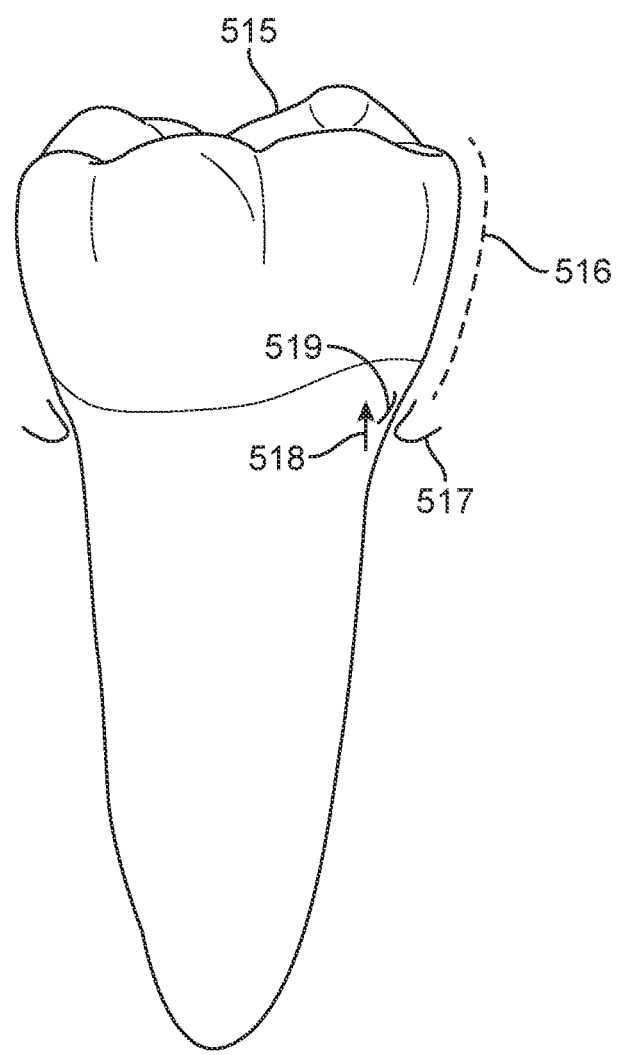
FIG. 5C illustrates how a fabricated shell may engage the undercut of a tooth, in accordance with embodiments.

FIG. 5C illustrates how a shell may be fabricated to engage the undercut of a tooth. Molar 515 is brought into contact with shell 516 comprising an undercut engagement surface 517, which applies an extrusive force 518 on undercut 519. The extrusive force 518 may be tailored to cause an extrusion of molar 515.

Figures 5D, 5E:
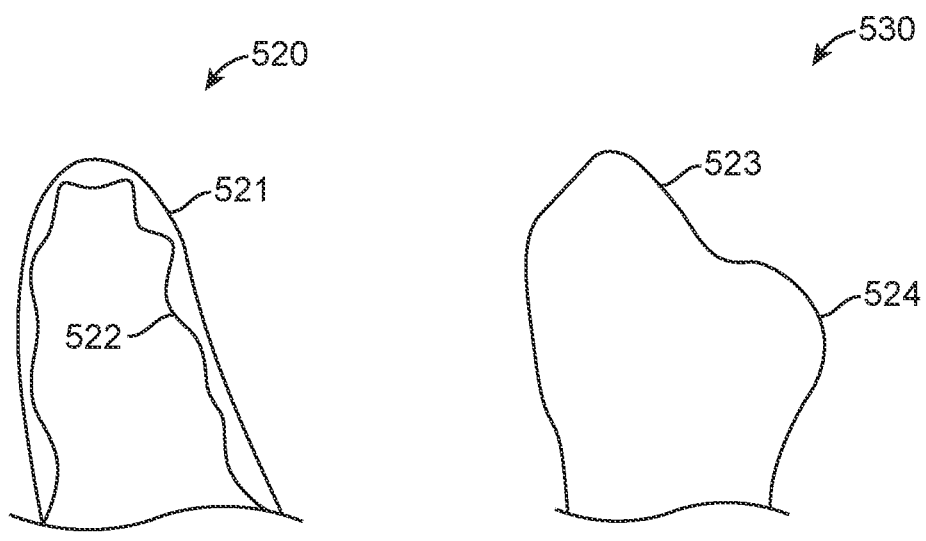
FIGS. 5D and 5E illustrate further options that may be available in the design of fabricated shells, in accordance with embodiments.

FIGS. 5D and 5E illustrate further options that may be available in the design of fabricated shells. In FIG. 5D, a shell 520 may be fabricated with a smooth outer layer 521 an irregular inner layer 522. The shape of the inner layer may be varied in any way desired in order to customize the engagement between the shell 520 and a tooth. For example, different portions of surface 522 may be made thicker in order to apply a set of forces to the surface of the tooth at particular points and particular directions, and still further portions of surface 522 may be made thinner in order to allow tooth movement in that direction or to avoid applying force in an unwanted direction. Another optional configuration is illustrated in shell 530 of FIG. 5E, which is fabricated with a portion 523 that conforms closely to the surface of a tooth and a second portion 524 that extends away from the tooth surface, for example to allow an attachment to fit within and optionally to engage with the surface portion 524.

Figure 6:
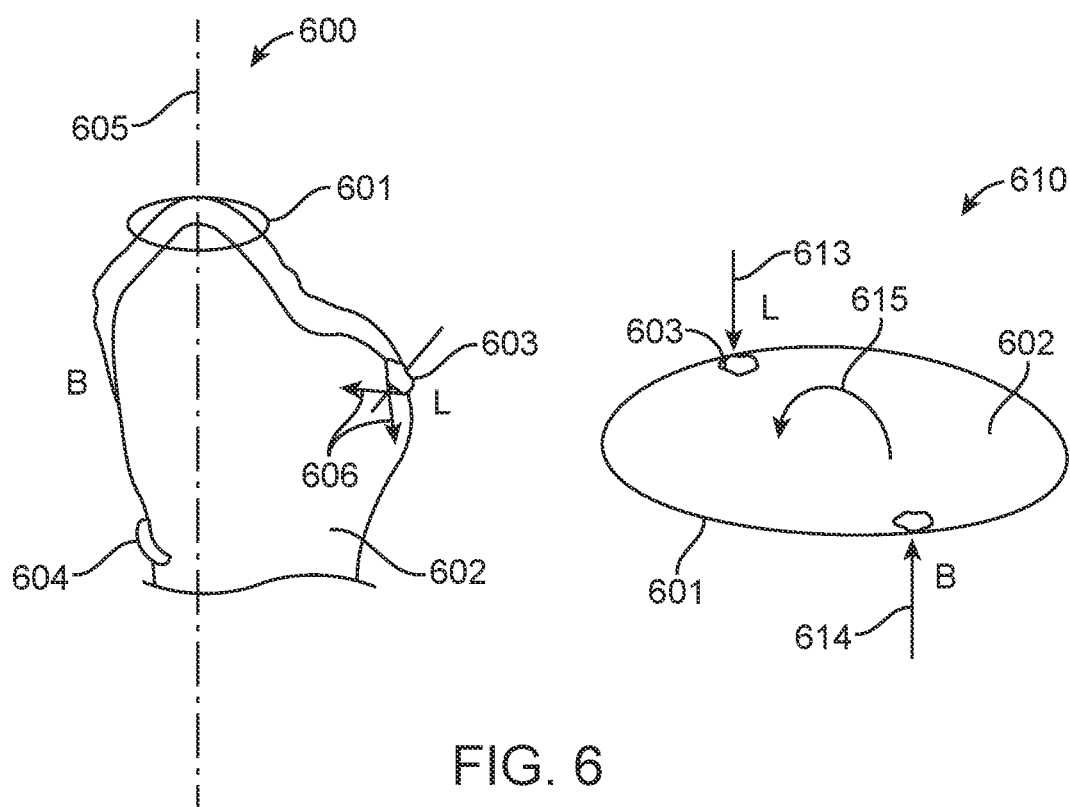
FIG. 6 illustrates forces that may be applied to induce a rotation of a tooth about a vertical axis, in accordance with embodiments.

FIG. 6 illustrates forces that may be applied to induce a rotation of a tooth about a vertical axis. FIG. 6 shows a tooth engaging a shell from two different perspectives. Side perspective 600 shows a view along the mesial-distal direction, in which a fabricated shell 601 contacts a tooth 602 to elicit a rotation about a vertical axis 605. The shell 601 is fabricated with tooth engagement surfaces 603 and 604, on opposite sides of the tooth. Engagement surface 603 applies forces 606 on the lingual surface of the tooth 602, while surface 604 applies forces on the distal side. By designing shell 601 and engagement surfaces 603 and 604, the forces on tooth 602 may be tailored to elicit a rotation.

Top perspective 610 shows the system along the occlusal-gingival axis, corresponding to vertical axis 605. The contact between engagement surface 603 and the lingual side of tooth 602 creates a force 613 in the buccal direction. The contact between engagement surface 604 and the buccal side of tooth 602 creates a force 614 in the lingual direction. These opposing forces create a moment 615 about the vertical axis of tooth 602, which may cause the tooth to rotate. The forces 613 and 614 may be tailored by the design of shell 601 and engagement surfaces 603 and 604. For example, the shell 601 may be fabricated out of a flexible material while engagement surfaces 603 and 604 may comprise a rigid material. If the shell structure is designed so that the rest positions of engagement surfaces 603 and 604 are closer together than the width of the tooth, engagement surfaces 603 and 604 will be deflected apart by the tooth 602 when the appliance is worn. This deflection deposits elastic potential energy in the flexible shell, resulting in forces 613 and 614 as the shell pulls itself back towards its rest configuration. The magnitude of this force may be varied by varying such properties as the degree of displacement of engagement surfaces 603 and 604, the elasticity of the flexible portion of shell 601, etc.

Figure 7A:
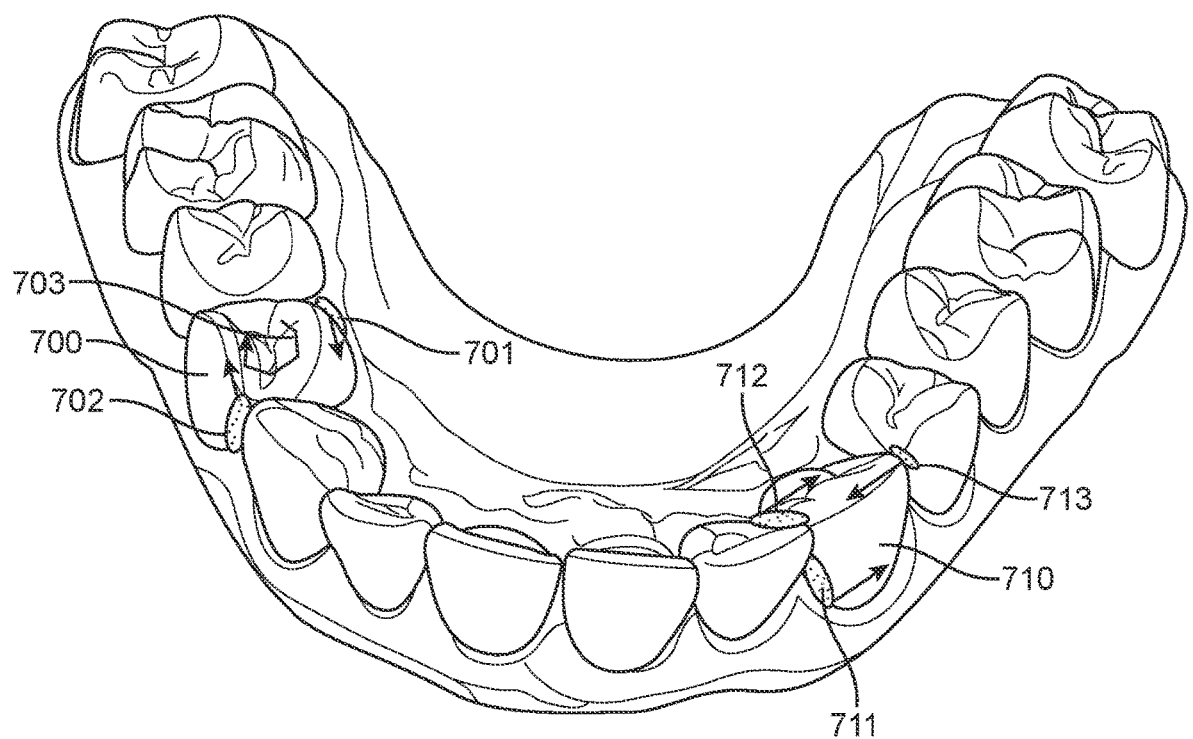
FIG. 7A illustrates forces that may be usefully applied to teeth using fabricated engagement structures such as interproximal engagement structures, in accordance with embodiments.

FIG. 7A illustrates forces that may be usefully applied to teeth using fabricated engagement structures such as interproximal engagement structures. Tooth 700 contacts interproximal tooth engagement structures 701 and 702 in order to induce a rotation 703. Interproximal tooth engagement structures 701 and 702 are connected to a shell fabricated to cause them to be pulled toward each other along a mesial-distal axis. The contact forces between the interproximal tooth engagement structures 701 and 702 and the tooth 700 cause a rotation 703 of the tooth.

A further type of movement that may be brought about by appropriately-fabricated engagement structures and shells is shown in the movement of tooth 710. Tooth 710 engages with interproximal engagement structures 711 and 712 near the gingival surface, as well as engagement structure 713 near the occlusal surface, in order to induce a tipping motion in tooth 710. A shell is configured so that interproximal engagement structures 711 and 712 are pulled in a distal direction while engagement structure 713 is pulled in a mesial direction. The opposing forces from the contact between the engagement surfaces and the tooth 710 create a net moment about a buccal-lingual axis of tooth 710, resulting in a tipping of the tooth in the mesial direction as the tooth is rotated about the buccal-lingual axis. Interproximal engagement structures 711 and 712 are fabricated on opposing lingual and buccal sides to provide a balanced force so that no unwanted rotation is induced about the vertical axis of tooth 710. In some cases, such as when there is a significant interproximal gap, engagement structures 711 and 712 may be merged into a single engagement structure.

Figure 7B:
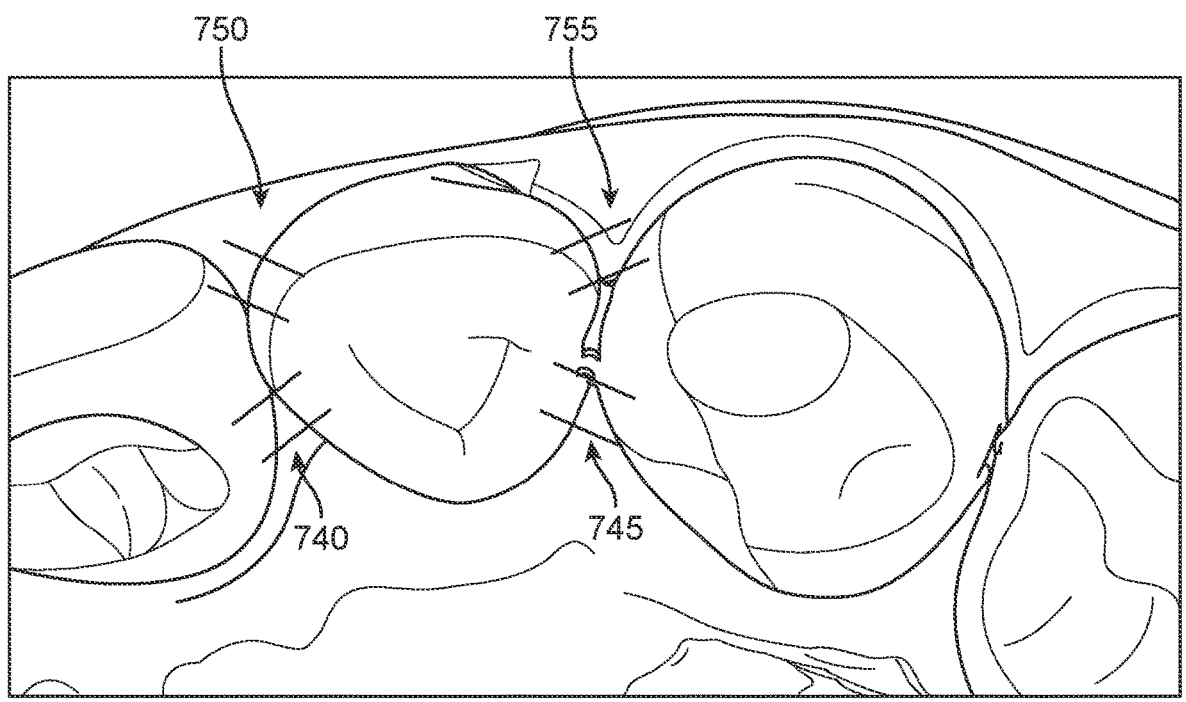
FIG. 7B illustrates typical locations in which interproximal engagement structures may be designed to engage a tooth, in accordance with embodiments.

FIG. 7B illustrates typical locations in which interproximal engagement structures may be designed to engage a tooth. Tooth 730 is illustrated along with 4 interproximal engagement zones: mesial-lingual zone 740, distal-lingual zone 745, mesial-buccal zone 750, and distal-buccal zone 755. Typically, an interproximal engagement structure that contacts a tooth will be fabricated so that it contacts the surface of the tooth in at least one of these zones. A typical contact point may be located on the buccal-lingual axis about as close to the center of the tooth as the outermost point of the tooth, or closer to the center than the outermost point. In some cases, an interproximal tooth engagement structure may be fabricated so that it reaches fully between teeth, allowing it to contact a tooth substantially in the center. For example, the interproximal engagement structure might contact tooth 730 between zones 740 and 750, or between zones 745 and 755. The height of an interproximal engagement structure may also be freely varied so that it may contact the tooth at any of a variety of heights.

Figure 8A:
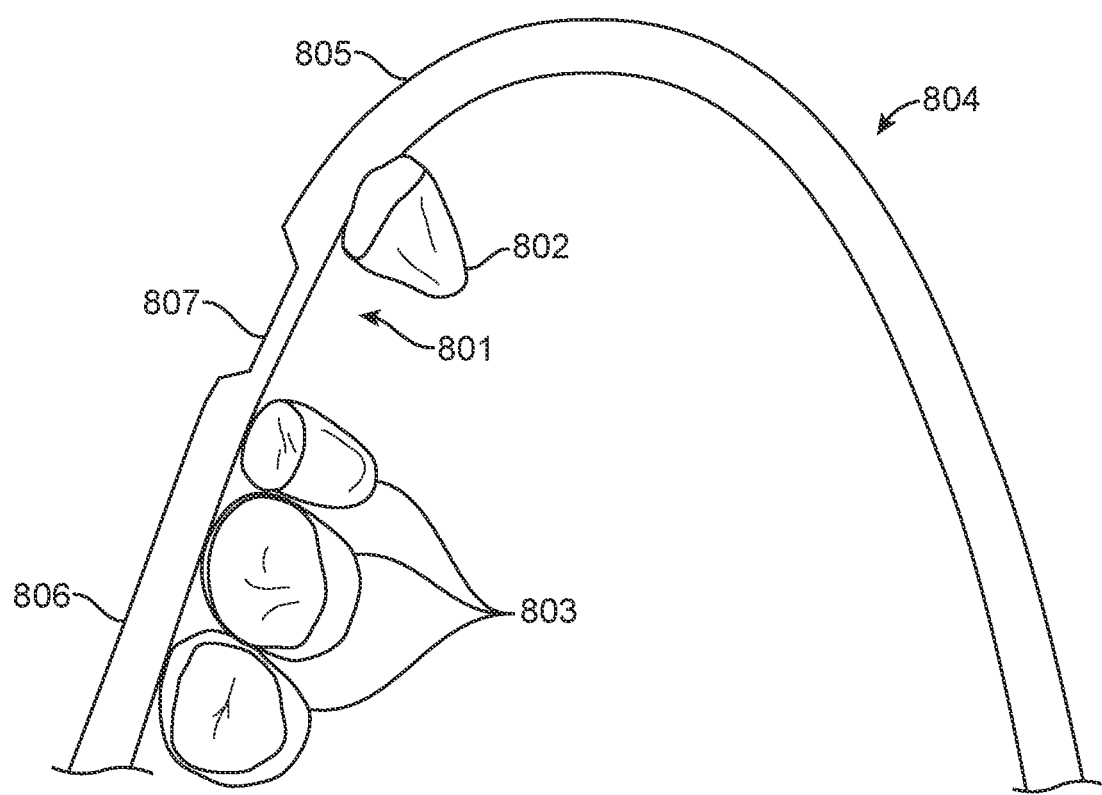
FIG. 8A illustrates a further configuration of a directly fabricated shell that allows translational movement of one or more teeth, in accordance with embodiments.

A further configuration of a directly fabricated shell that allows translational movement of one or more teeth is illustrated in FIG. 8A. A gap 801 between anterior tooth 802 and posterior teeth 803 is to be closed, for example, by applying forces such as those illustrated in FIG. 2. The closing of the gap will result in movement of teeth 802 and 803 toward each other. Shell 805 can be fabricated in such a way as to permit, encourage, or guide this movement. For example, Shell 805 may comprise a mesial portion 805 in contact with teeth mesial of gap 801, a distal portion 806 in contact with teeth distal of gap 801, and a gap portion 807 lying at least partially within region of gap 801. In order to allow movement of the teeth 802 and 803 to fill gap 801, gap portion 807 may be fabricated to be more flexible than other portions of shell 804. For example, gap portion 807 may be fabricated to be thinner than portions 805 and 806. Alternatively or additionally, gap portion 807 may be fabricated with a material more flexible than portions 805 and 806. In some embodiments, gap portion 807 may be configured to apply an elastic force to close gap 801. For example, gap portion 807 may comprise a directly fabricated spring structure.

Figure 8B:
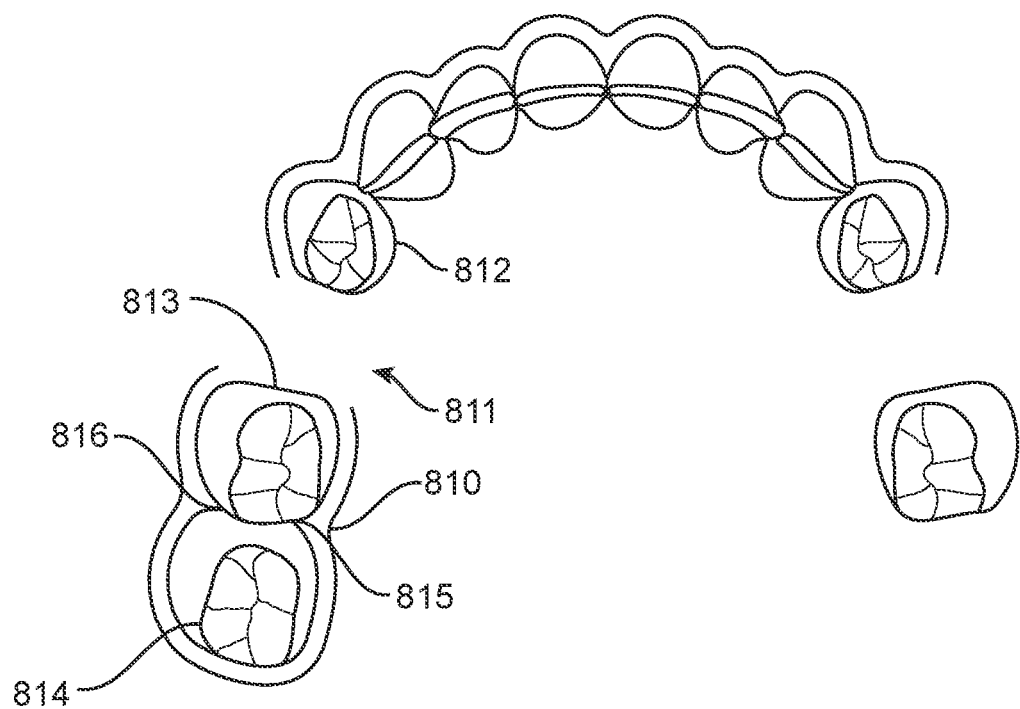
FIG. 8B illustrates how interproximal engagement structures may be employed to help anchor a fabricated shell to one or more teeth, in accordance with embodiments.

FIG. 8B illustrates how interproximal engagement structures may be employed to help anchor a fabricated shell to one or more teeth, for example to provide a motion such as those illustrated in FIG. 2 and FIG. 8B. When closing a gap 811 between anterior teeth 812 and posterior teeth 813, it may be desirable to anchor shell 810 securely to the posterior teeth 813. Typically, this anchoring may be accomplished by contacting an open posterior tooth surface, such as surface 814. But additionally or alternatively, the appliance shell may be fabricated with interproximal engagement structures, such as structures 815 and 816. These structures can engage the interproximal surfaces of teeth 813 to provide an anchoring force against which a tooth moving force may be applied. In some cases, structures 815 and 816 comprise a single, joined structure that extends across the interproximal gap. Such structures can be used to surround a large fraction of the surface area of a tooth. For example, in various aspects, the interproximal structures disclosed herein can provide tooth receiving structures that contact or cover most or all of the circumferential surface of a tooth, where the circumferential surface of a tooth includes the interproximal surfaces, the lingual surface, and the buccal surface of the tooth. For example, such tooth-receiving structures can cover 50 percent or more of the circumferential surface of a tooth such as a molar. In some cases, tooth-receiving structures can cover 60 percent or more, 70 percent or more, or 80 percent or more of the circumferential surface of a tooth. In particular, tooth-receiving structures for incisors, canines and premolars can provide such higher area coverage. Alternatively, smaller amounts of tooth coverage can be used; for example, less than 50 percent, less than 20 percent, less than 10 percent, or less than 5 percent of the circumferential surface of a tooth surface can be covered. In some cases, a first tooth-receiving cavity can be shaped to engage most of the circumferential surface of a first tooth when worn and a second tooth-receiving cavity can be shaped to engage a smaller amount of the circumferential surface of a second tooth when worn. Furthermore, the interproximal structures disclosed herein can, in combination with walls on the lingual and buccal surfaces, provide engagement along most or all of a circumference of a tooth, for example, extending around 90 percent or more of the circumference of a tooth, or even entirely around the circumference of a tooth. Such a structure allows not only strong anchoring to the tooth but also the application of forces in many different directions, and the constraint or movement of a tooth to a particular position and orientation. For example, as a tooth is moved with an interproximal engagement structure, the structure can also prevent unwanted rotation of lateral movement by holding the tooth in a desired orientation and resisting movement of the tooth off of the desired trajectory. This feature can further benefit treatment planning, as errors due to unwanted movement or rotation can be reduced, thus allowing more accurate estimation of the effects of treatment.

Figure 9A:
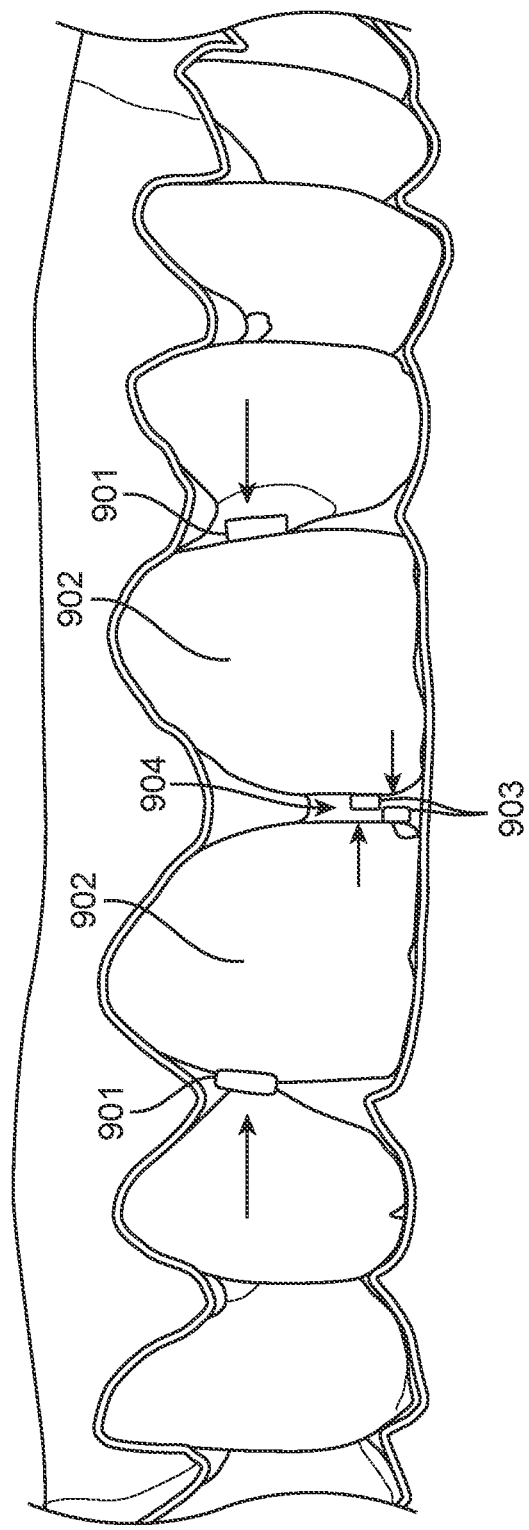
FIG. 9A depicts how a plurality of tooth-engagement structures may be configured to treat a diastema, in accordance with embodiments.

Further illustrating the range of tooth movements made possible by the direct fabrication of interproximal structures on orthodontic appliances, FIG. 9A depicts how a plurality of tooth-engagement structures may be configured to treat a diastema. Interproximal tooth engagement structures 901 are placed on opposite sides of the two central incisors 902 to provide a tooth-moving force on each toward the midline. Additional tooth-engagement structures 903 are placed closer to the occlusal plane along the midline to provide a counter-moment. Each of the tooth-engagement structures is attached to an elastic portion of an aligner such that the structure is deflected from its rest position by the geometry of the tooth the structure contacts. This causes each tooth-engagement structure to apply an elastic force in the respective direction specified in FIG. 9A. The collective result of the forces is a translation of the central incisors 902 toward the midline, closing the diastema 904. A person of ordinary skill in the art will appreciate that this design may be employed similarly to close gaps between other pairs of teeth.

Figure 9B:
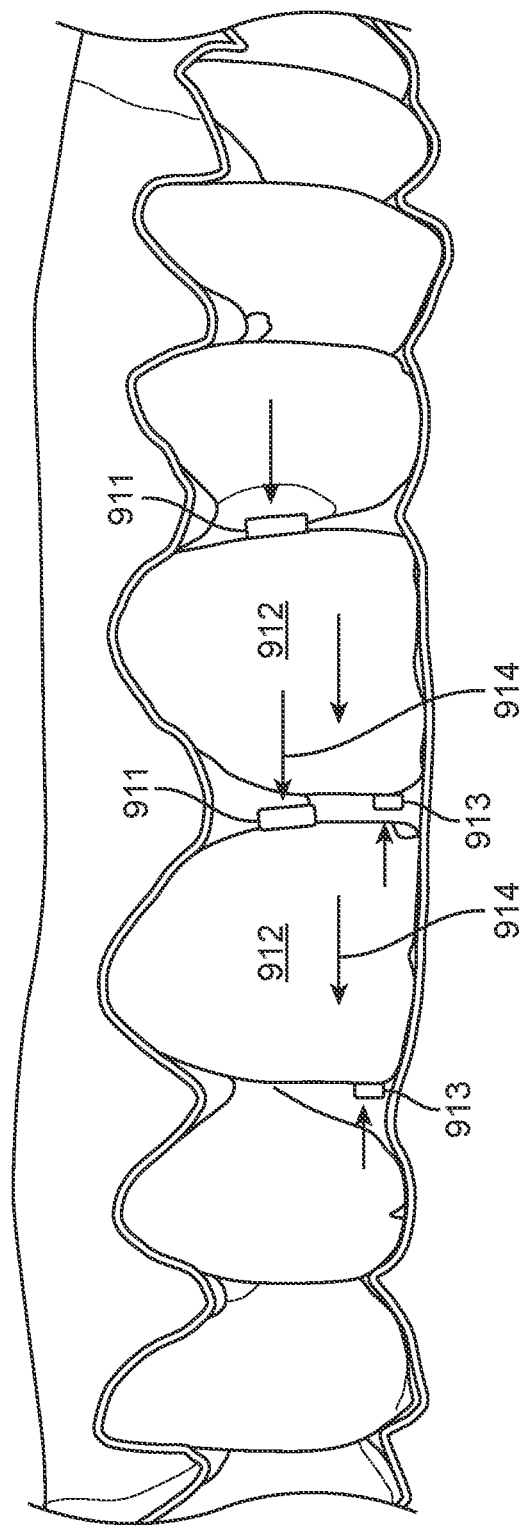
FIG. 9B illustrates how interproximal tooth-engagement structures may be employed to induce a midline shift, in accordance with embodiments.

FIG. 9B illustrates how interproximal tooth-engagement structures may be employed to induce a midline shift. Interproximal tooth engagement structures 911 may be fabricated so that each contacts a chosen side of a tooth, for example the right side of each central incisor 912, as illustrated. Opposite each interproximal tooth-engagement structure 911 is another tooth-engagement structure 913, placed closer to the occlusal plane to provide a counter-moment. Each of the tooth-engagement structures is attached to an elastic portion of an aligner such that the structure is deflected from its rest position by the geometry of the tooth the structure contacts. This causes each tooth-engagement structure to apply an elastic force in the respective direction specified in FIG. 9B. The collective result of the forces is a translation of the central incisors 912 to the left, producing a leftwards midline shift 914. By shifting the positions of each structure in a mirror image about the midline, a rightwards motion may be induced instead. A person of ordinary skill in the art will appreciate that this design may be employed similarly to move other teeth, including single teeth or teeth in groups larger than two, as desired.

Figure 9C:
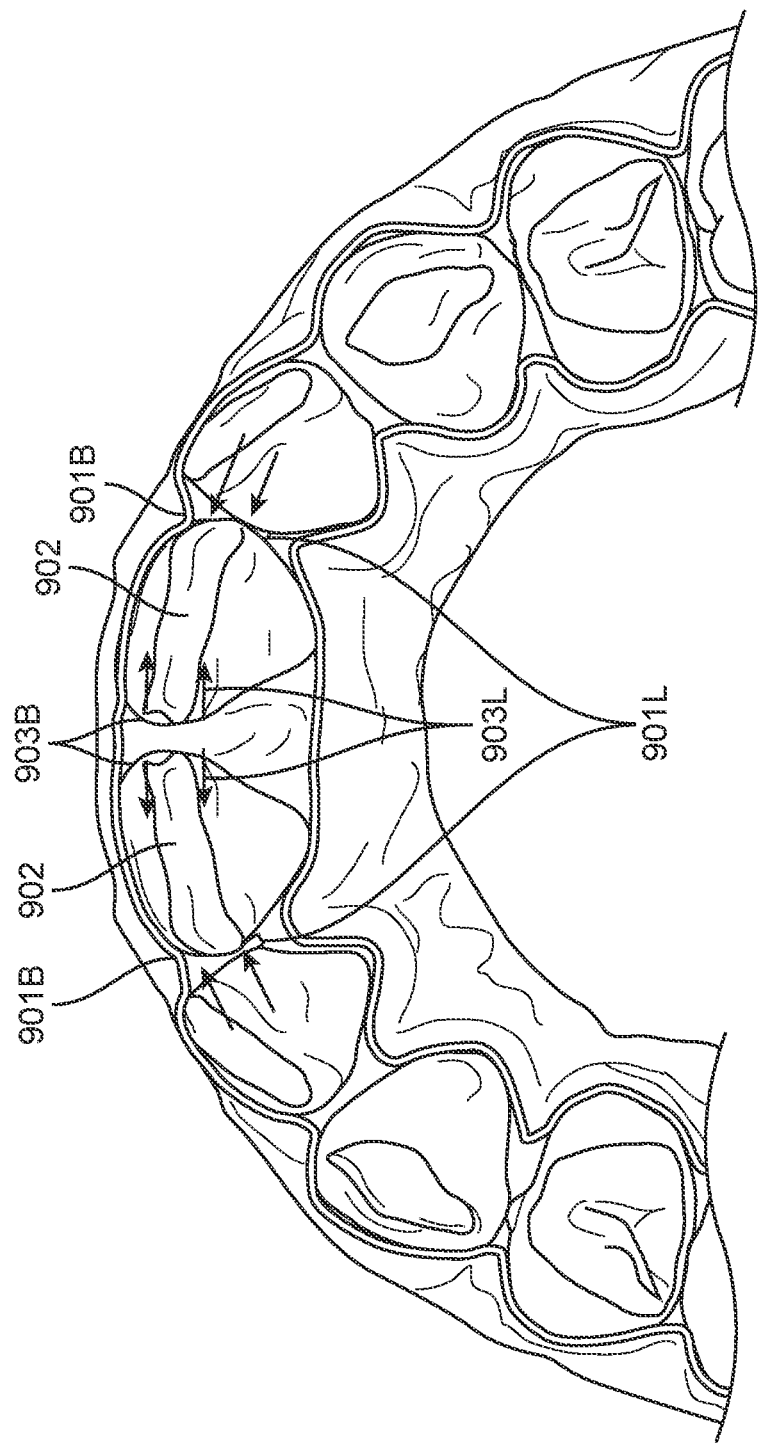
FIG. 9C illustrates how a pair of interproximal tooth-engagement structures disposed oppositely on buccal and lingual sides of a tooth may be used to apply the tooth-moving forces of any of the various structures described herein, in accordance with embodiments.

FIG. 9C illustrates how a pair of interproximal tooth-engagement structures disposed oppositely on buccal and lingual sides of a tooth may be used to apply the tooth-moving forces of any of the various structures described herein. FIG. 9C shows a view from the occlusal plane of a plurality of tooth-engagement structures configured to close a diastema, as in FIG. 9A. Each of the interproximal tooth-engagement structures 901 from FIG. 9A is replaced with a pair of interproximal tooth-engagement structures on opposite buccal and lingual sides of incisors 902. These structures, namely buccal interproximal tooth-engagement structures 901B and lingual interproximal tooth-engagement structures 901L, provide collectively tooth-moving forces in the indicated directions, while any buccal or lingual force may be canceled by the forces of the corresponding structure on the opposite face of the tooth. Similarly, the counter-moment tooth-engagement structures 902, located nearer the occlusal plane, are replaced with buccal tooth-engagement structures 903B and lingual tooth-engagement structures 903L to similar effect. This configuration of tooth-engagement structures may be desirable, for example, when teeth are too closely arranged to permit a tooth-engagement structure to fit within the gap between teeth.

Figure 9D:
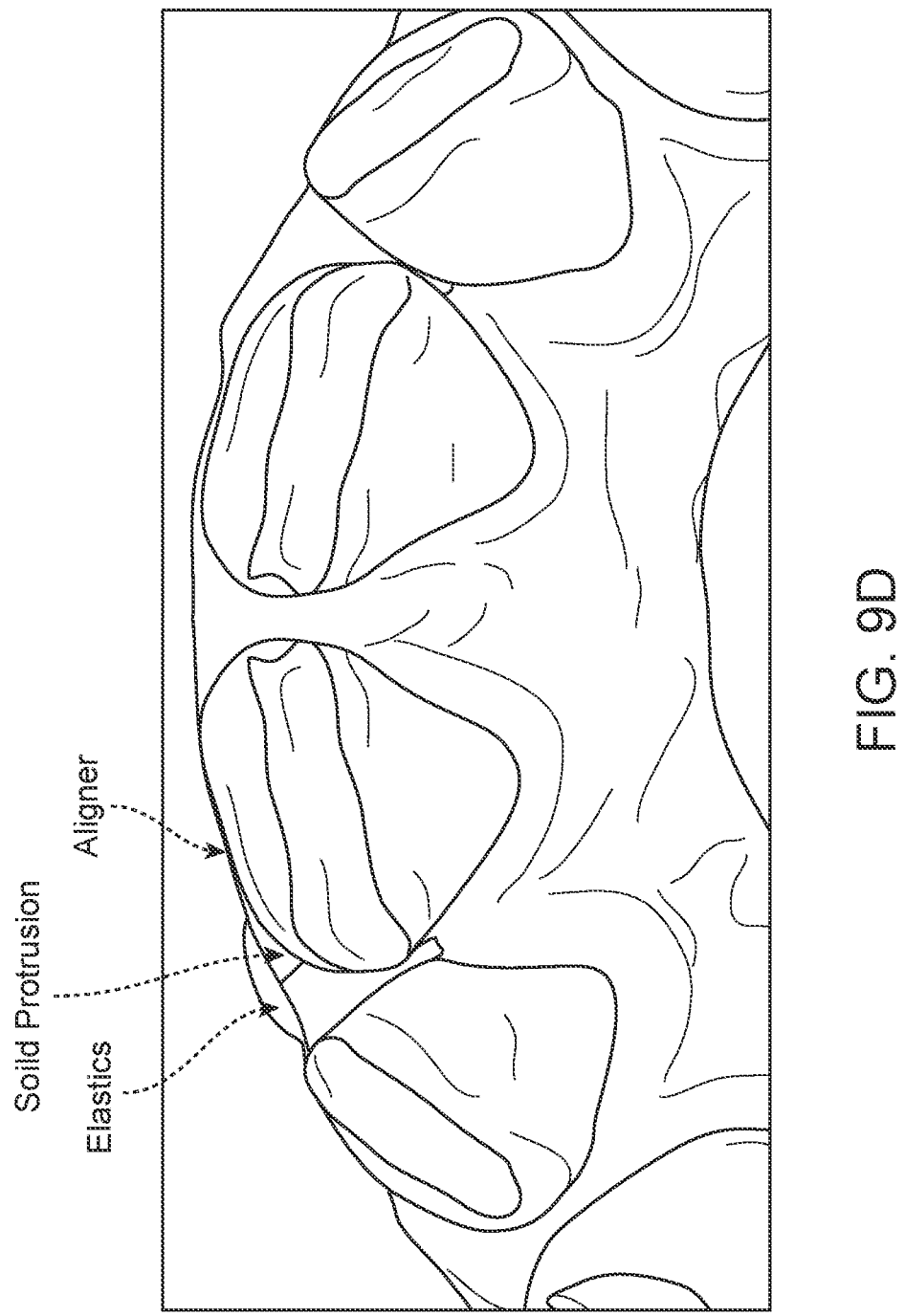
FIG. 9D illustrates how an aligner may be fabricated with both elastic and rigid materials to cause a tooth-engagement structure to apply a force on a tooth, in accordance with embodiments.

FIG. 9D illustrates how an aligner may be configured to cause a tooth-engagement structure to apply a force on a tooth. An aligner is worn on a patient's teeth, as illustrated, bringing both the aligner and a tooth-engagement structure within contact of one or more of a patient's teeth. The tooth-engagement structure comprises a solid protrusion, as labeled, attached to the aligner. In the region of attachment, the aligner comprises an elastic material, such that the solid protrusion may move. The aligner is fabricated such that the location of the solid protrusion in the nominal design of the aligner is different from its location when mounted in a patient's mouth. Typically, this difference may be in the range of about 1 to 2 mm or so, with the direction of the protrusion's deflection when worn being opposite the direction of the desired force. When mounted in a patient's mouth, the geometry of the tooth will guide the protrusion into the interproximal space, causing the elastic portion of the aligner to stretch, and storing elastic potential energy therein. This elastic potential energy results in a restoring force that may be used to cause a tooth movement.

The use of mixed elastic and rigid materials in removable appliances, as illustrated in FIG. 9D, provides several benefits over prior systems that used only rigid materials. First, elastic materials allow for the application of force on a tooth at multiple points of contact. With rigid materials alone, in some embodiments it may not be possible to apply force to more than three points of a tooth at the same time, because the use of four or more contact points can present an unstable system. Without being bound by any particular theory, this phenomenon can be caused for reasons similar to the reason that four-legged chairs may wobble, but three-legged chairs do not. In rigid materials, force is either applied or not applied, with little to no room for error. A small movement of a tooth, or imperfection in an appliance, can cause a force to be eliminated. This limitation could lead to unwanted forces and moments in some cases, and in failures to apply wanted forces and moments in others. The use of elastic material solves this potential problem, since the force applied at each point of contact may now be varied smoothly. In conjunction with rigid material to be used at the point of contact, this allows the applications of variable forces at a plurality of different precisely chosen points on each tooth.

Second, the use of mixed elastic and rigid materials provides a much greater range of operation than available in prior systems. Some prior systems of removable aligners had operable ranges of around 0.2 to 0.25 mm, so that dozens of aligners might be required to move a tooth over a desired trajectory of several millimeters. Elastic materials can provide a much larger range of motion: as much as 1 to 2 mm or more, for example. This enables each appliance to move the teeth over a comparable distance, allowing adjustment of a patient's teeth using a quarter to a tenth as many appliances, if not fewer, than were previously required with some systems.

Third, the large range of motion allows for greater flexibility in treatment. In some cases, a patient's teeth do not move as predicted in response to applied forces. In those cases, an appliance fabricated based on an expected tooth position may not match the actual position of a patient's teeth. Appliances fabricated with a mix of elastic and rigid materials allow a greater range of motion, and therefore a greater flexibility. Even if a patient's teeth are 1 or 2 mm or more away from their expected positions, an appliance comprising elastic material may be able to receive the teeth. This greater flexibility can avoid situations in which appliances would otherwise need to be refabricated, to account for unexpected tooth movements.

Figure 10A:
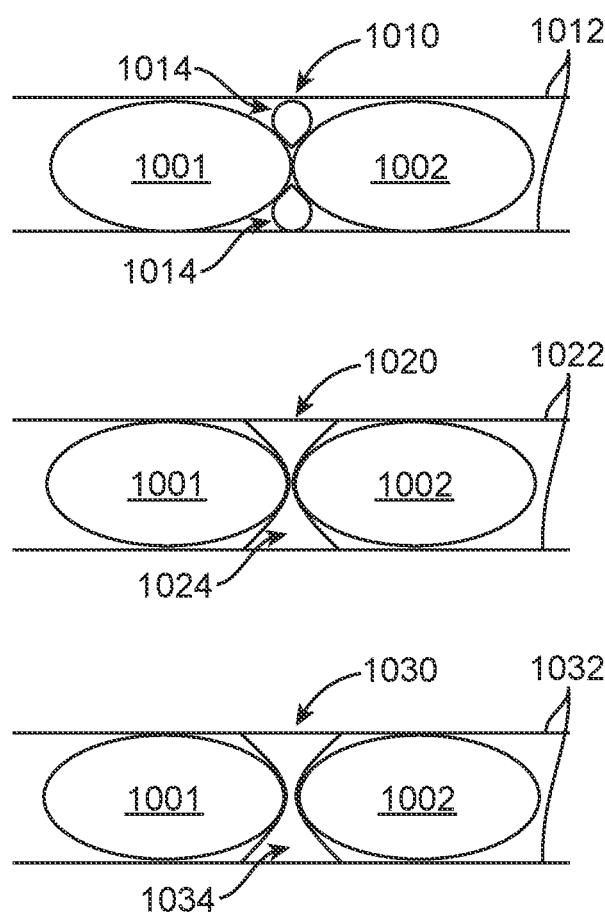
FIG. 10A illustrates a plurality of appliances with interproximal engagement structures with an interproximal width that varies among the appliances.

Appliances comprising interproximal engagement structures as disclosed herein can be provided as a sequence of appliances with differing interproximal engagement structures and/or teeth-receiving cavities, so as to provide tooth moving forces to move a tooth along a trajectory from a first location and orientation to a second location and orientation. In some cases, the sequence of appliances can comprise different forms of interproximal engagement structures in order to better engage the interproximal space at each step of treatment. For example, FIG. 10A shows parts of a plurality of appliances 1010, 1020, and 1030 configured to be sequentially applied to teeth 1001 and 1002 to engage the interproximal space of the teeth, thereby generating tooth-moving forces. Each tooth illustrated herein can also correspond to a tooth receiving cavity shaped to receive the respective tooth; accordingly, for example, appliance 1010 comprises tooth receiving cavities shaped to receive teeth 1001 and 1002. The interproximal engagement structures disclosed herein can be contiguous with or replace portions of the tooth receiving cavities, in some cases. Appliance 1010 comprises a plurality of interproximal engagement structures 1014, one on each of the buccal and lingual side. The interproximal engagement structures 1014 extend into the interproximal space between teeth 1001 and 1002 without traversing the interproximal gap entirely. This configuration can be used when teeth 1001 and 1002 have little or no interproximal gap, for example, when they are touching tightly together. Interproximal engagement structures 1014 can apply tooth moving forces, for example, when pressed inwards by appliance walls 1012, or when pulled or pushed by forces transmitted by the appliance from other portions of the appliance, such as an anchored portion as shown in FIG. 8B. Interproximal engagement structures 1014 can also apply forces to maintain teeth 1001 and 1002 in position, for example, by resisting other tooth-moving forces applied to the teeth. Interproximal engagement structures 1014 can also provide lingual or buccal aligning forces, for example, by applying a resisting force to teeth 1001 and 1002 that urges them in a buccal or lingual direction by providing more space in an aligned position or orientation than a misaligned position or orientation.

Appliance 1020 can be applied when teeth 1001 and 1002 have a small interproximal gap, but one large enough that an interproximal engagement structure can be fit between the teeth. Accordingly, appliance 1020 comprises an interproximal engagement structure 1024 that extends through the interproximal gap between teeth 1001 and 1002 and adjoins the lingual and buccal appliance walls 1022. Appliance 1020 could be used, for example, after appliance 1010 has widened an interproximal gap slightly between teeth 1001 and 1002. Interproximal engagement structure 1024 can comprise a solid structure that is wide near the lingual and buccal surfaces of the appliance while narrowing in the interproximal region, as illustrated, so as to fit the form of the tooth. Alternatively, interproximal engagement structure 1024 can comprise thin walls that approach each other (and optionally join) in the interproximal region, thereby providing a void between the walls. As another alternative, interproximal engagement structure 1024 can comprise a single wall of substantially uniform thickness extending directly from the lingual to the buccal side of the appliance. Interproximal engagement structure 1024 can extend downwards from an occlusal area to a point near the gingiva, or stop short of such a point, as desired. The structure can be shaped in a vertical dimension to match the shape of the teeth, either above or below the point of contact of teeth 1001 and 1002, or optionally both above and below. The teeth 1001 and 1002 can thus be substantially enveloped by walls in contact with the tooth surfaces, especially if further interproximal structures are provided on the opposite sides of the teeth.

A further step in treatment is shown with regard to appliance 1030, wherein the appliance 1030 can be applied when teeth 1001 and 1002 have a larger interproximal gap. The interproximal engagement structure 1034 is accordingly wider and can comprise a solid piece extending across the gap or two separate walls, each extending between the lingual and buccal walls 1032, and each contacting a single tooth, with a void in between. Optionally, the interproximal engagement structures can comprise resilient or otherwise elastic material. For example, the engagement structure can comprise a stiff material at and around the point of contact with a tooth, while comprising an elastic material extending to the buccal and/or lingual walls. Alternatively, the interproximal engagement structure can comprise an elastic material alone, or a stiff material alone. Although appliances 1010, 1020, and 1030 have been described as sequentially widening the interproximal gap between teeth 1001 and 1002, it will be understood that the reverse process is also possible. For example, the interproximal engagement structures 1034, 1024, and 1014 can be used to provide resistive or aligning forces to teeth 1001 and 1002 as they are being moved together, in which case appliances 1030, 1020, and 1010 could be worn in sequence as the interproximal gap narrows, to guide teeth 1001 and 1002 to a final alignment position. Furthermore, the position and angle of the interproximal engagement structures can vary among the plurality of appliances to tailor the amount of force applied, the angle of force applied, and the location of force application on the teeth, so as to produce a desired tooth movement. For example, as the teeth 1001 and 1002 move, they may also change orientation or position in a manner that can be corrected using subsequent appliances by adjusting the forces applied to the teeth. The interproximal engagement structures can also be shaped to engage a plurality of surfaces of a tooth or a continuous surface extending through an interproximal gap and be shaped to apply constraining forces to guide a tooth along a trajectory in both position and orientation.

Figure 10B:
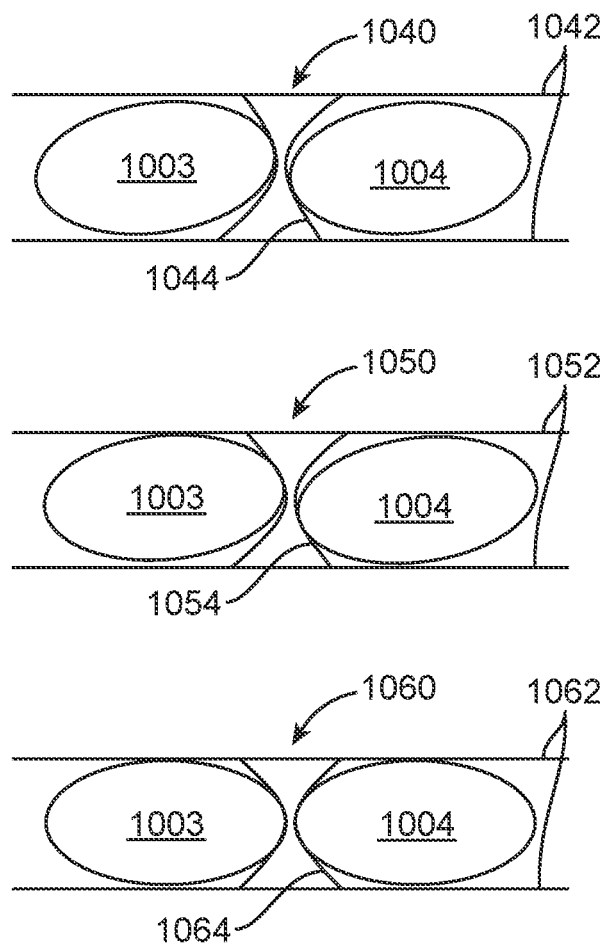
FIG. 10B illustrates a plurality of appliances with interproximal engagement structures disposed at a varying angle.

In addition to varying width to induce tooth movement, appliances with interproximal structures can also vary the angle of contact of interproximal structures with teeth, which can be used to cause more complex movements such as rotation. For example, FIG. 10B illustrates a plurality of appliances 1040, 1050, and 1060, each comprising a respective interproximal engagement structure 1044, 1054, and 1064 extending between appliance walls 1042, 1052, and 1062 in a lingual-buccal direction. The interproximal engagement structures are shaped to extend through the interproximal gap between teeth 1003 and 1004. Each interproximal engagement structure is oriented at a different angle, and thus engages teeth 1003 and 1004 at different locations to apply tooth moving forces. Initially, teeth 1003 and 1004 are tilted out of alignment; the contact with interproximal engagement structure 1044 applies a tooth moving force that causes a rotation of the teeth toward a desired orientation. The force applied need not be perpendicular to the contacted surface of the tooth; for example, the interproximal engagement structure may be oriented at an angle such that the force includes a frictional force between the surfaces of the aligner and tooth. This frictional force can be compensated for in determining the required force to be delivered to the tooth. After some movement, aligner 1050 is provided, with interproximal engagement structure 1054 arranged to contact the teeth at a different angle to continue the desired movement. Finally, aligner 1060 is provided with interproximal engagement structure 1064 at a third angle, and teeth 1003 and 1004 arrive at their desired orientation.

Figure 11:
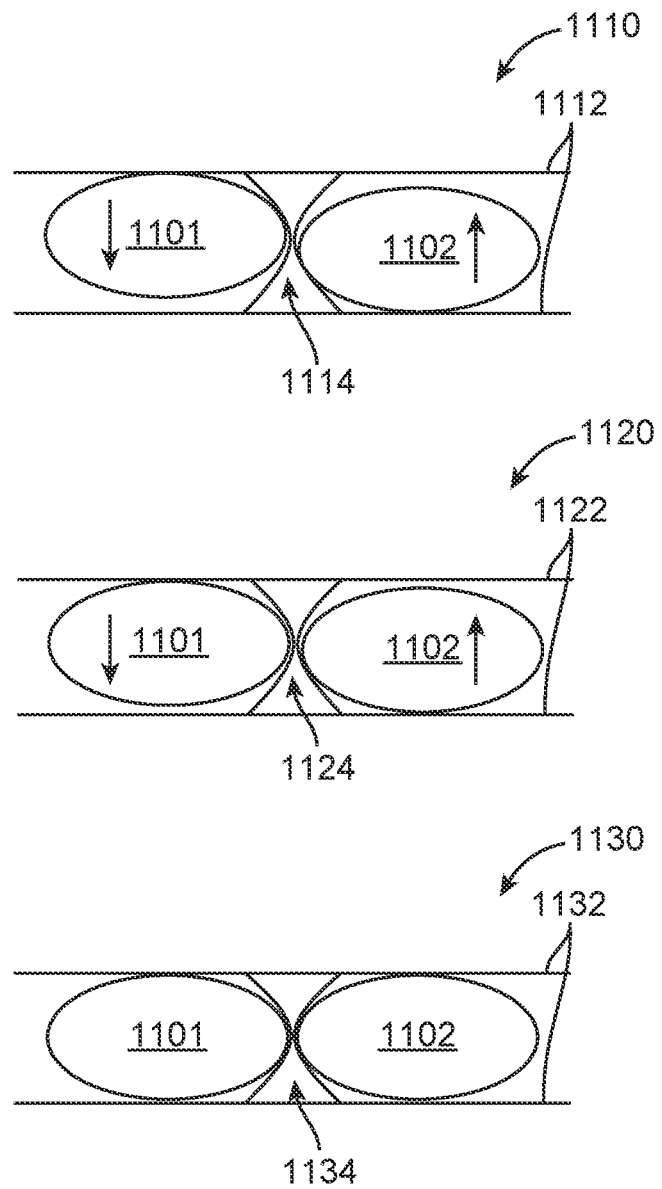
FIG. 11 illustrates a plurality of appliances with interproximal engagement structures having varying buccolingual lengths, configured to apply forces on teeth using the walls of the appliances.

A further example of tooth movement using interproximal structures is shown in FIG. 11. Teeth 1001 and 1002 are initially out of alignment in a lingual-buccal direction and require correction to be properly aligned. In particular, tooth 1001 is illustrated initially out of alignment in a lingual direction (up) and tooth 1002 is out of alignment in a buccal direction (down). Accordingly, a plurality of appliances 1110, 1120, and 1130 with respective interproximal engagement structures 1114, 1124, and 1134 are provided to apply teeth-moving forces. The appliances are fabricated with interproximal engagement structures that have a rest length shorter than the distance across the gap from the lingual surface of tooth 1001 to the buccal surface of tooth 1002. The structure of appliance 1110 thus stretches in the buccal-lingual direction when worn, and accordingly provides forces as shown tending to move teeth 1001 and 1002 into alignment. The stretching of appliance 1110 can include stretching of a resilient material in interproximal structure 1114, a bending of a resilient structure in appliance walls 1112, or a combination thereof in which both walls 1112 and interproximal structure 1114 comprise elastic or otherwise resilient materials. As the teeth move towards alignment, a new appliance 1120 can be provided in which the length of interproximal structure 1124 has been correspondingly shortened so as to maintain a tooth moving force. Appliance 1130 illustrates a further step with an appliance in which interproximal structure 1134 comprises a length equal to a desired lingual-buccal distance—such as the width of teeth 1001 and 1002, for example—thus bringing teeth 1001 and 1002 into the desired orthodontic alignment.

Figure 12A:
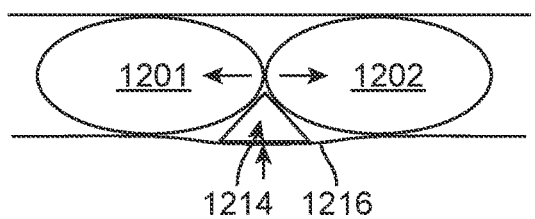
FIG. 12A illustrates an appliance with an interproximal engagement structure coupled to a resilient wall, positioned and shaped to urge a movement of teeth.
Figure 12B:
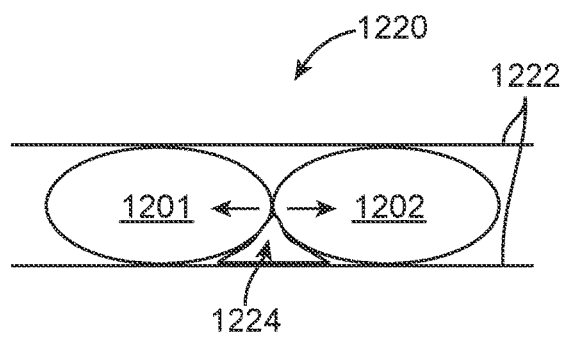
FIG. 12B illustrates an appliance with an interproximal engagement structure comprising a resilient material, positioned and shaped to urge a movement of teeth.

In a further aspect, appliances can be fabricated comprising interproximal structures configured to fit within and apply a separating force to an interproximal region of a tooth. FIGS. 12A and 12B illustrate portions of respective appliances 1210 and 1220, each of which comprises an interproximal engagement structure to apply a force to teeth 1201 and 1202. In appliance 1210 of FIG. 12A, elastic or otherwise resilient appliance walls 1212 are provided on opposing lingual and buccal sides of teeth 1201 and 1202. An interproximal engagement structure 1214 comprising a relatively stiff material is provided on an appliance wall and positioned to fit within the interproximal area between teeth 1201 and 1202. Although illustrated as a triangular wedge, it will be understood that interproximal engagement structure 1214 can take on a variety of shapes, such as being shaped to follow the contours of the interproximal region of teeth 1201 and 1202. The size of interproximal engagement structure 1214 is sufficiently large that it is larger than the normal space between the appliance wall 1212 and the interproximal space; accordingly, as the wall comprises a resilient material, the wall deforms when worn, illustrated by deformation 1216. The elasticity of the deforming material provides a restoring force that drives the interproximal engagement structure 1214 into the interproximal gap, thus providing a tooth moving force on teeth 1201 and 1202, as illustrated.

FIG. 12B illustrates a second configuration of an appliance 1220 with stiff walls 1222 and a resilient interproximal engagement structure 1224 positioned to engage teeth 1001 and 1002 in an interproximal gap. Again, the interproximal engagement structure 1224 is too large to fit in the interproximal gap. In this case, the interproximal engagement structure 1224 comprises a resilient material; thus, it deforms to fit in the gap, shown by the bending of structure 1224 along the surfaces of teeth 1201 and 1202, thereby providing a restoring force of deformation to provide a tooth moving force to teeth 1201 and 1202. As with FIG. 12A, although the interproximal engagement structure 1224 is depicted as a deformed triangular wedge, it will be understood that interproximal engagement structure 1224 can take on a variety of shapes both prior to and after deformation, such as being shaped to follow the contours of the interproximal region of teeth 1201 and 1202. It will be further understood with regard to FIGS. 12A and 12B that interproximal engagement structures 1214 and 1224 can be provided on any side of the teeth, such as the lingual side, the buccal side, or the occlusal side, and additional interproximal engagement structures can be provided to simultaneously engage a combination of sides of an interproximal region, for example, on both a lingual and buccal side of an interproximal region. Moreover, a similar appliance can be provided in which both the walls of the appliance and the interproximal engagement structure are resilient, and thus can both deform to apply force.

Figure 13A:
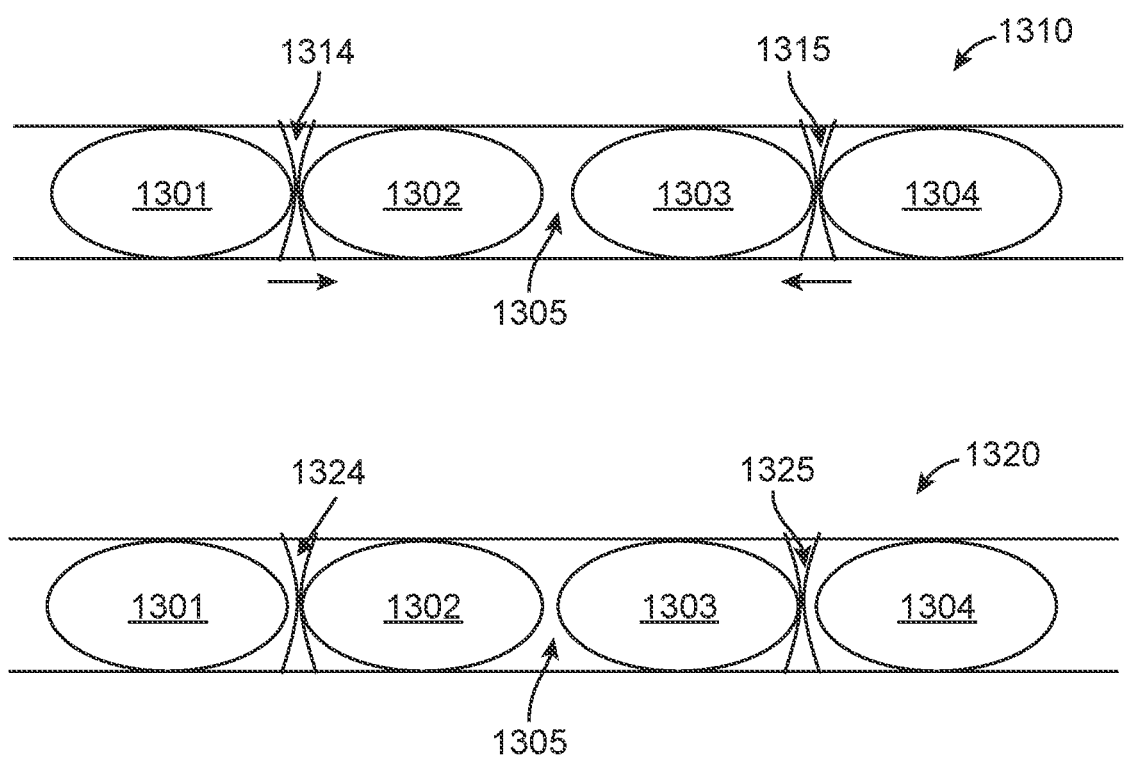
FIG. 13A illustrates an appliance in which a first interproximal engagement structure extends through a first interproximal region between a first two teeth and a second interproximal engagement structure extends through a second interproximal region between a second two teeth.

Interproximal engagement structures can also be employed to apply forces on multiple, separated teeth surfaces. FIG. 13A illustrates an appliance 1310 in which a first interproximal engagement structure 1314 extends through an interproximal region between two teeth 1301 and 1302, while a second interproximal engagement structure 1315 extends through an interproximal region between two teeth 1303 and 1304. The two interproximal engagement structures 1314 and 1315 are coupled to the walls of the appliance 1310 and positioned such that the distance between the two structures is smaller than the initial distance between the corresponding interproximal gaps. Accordingly, the interproximal engagement structures and/or the appliance walls are distorted out of their rest positions, thereby producing a restoring force that urges teeth 1302 and 1303 to move as shown, thereby moving the two teeth into alignment by closing gap 1305. A plurality of appliances can be employed to continue applying tooth moving forces in this manner; for example, appliance 1320 comprises interproximal engagement structures 1324 and 1325 that are shifted to different positions to account for the intervening movement of the patient's teeth. The interproximal engagement structures of appliance 1320 can thus continue to urge the teeth of the patient along a desired trajectory. It will further be appreciated that, by moving teeth 1302 and 1303 closer together, they are respectively moved farther apart from teeth 1301 and 1304. This can remove forces impingent on teeth 1301 and 1304 from teeth 1302 and 1303, which can result in teeth 1301 and 1304 additionally moving into better alignment; for example, they can follow their neighbors towards gap 1305 to improve overall balance in tooth spacing.

Figure 13B:
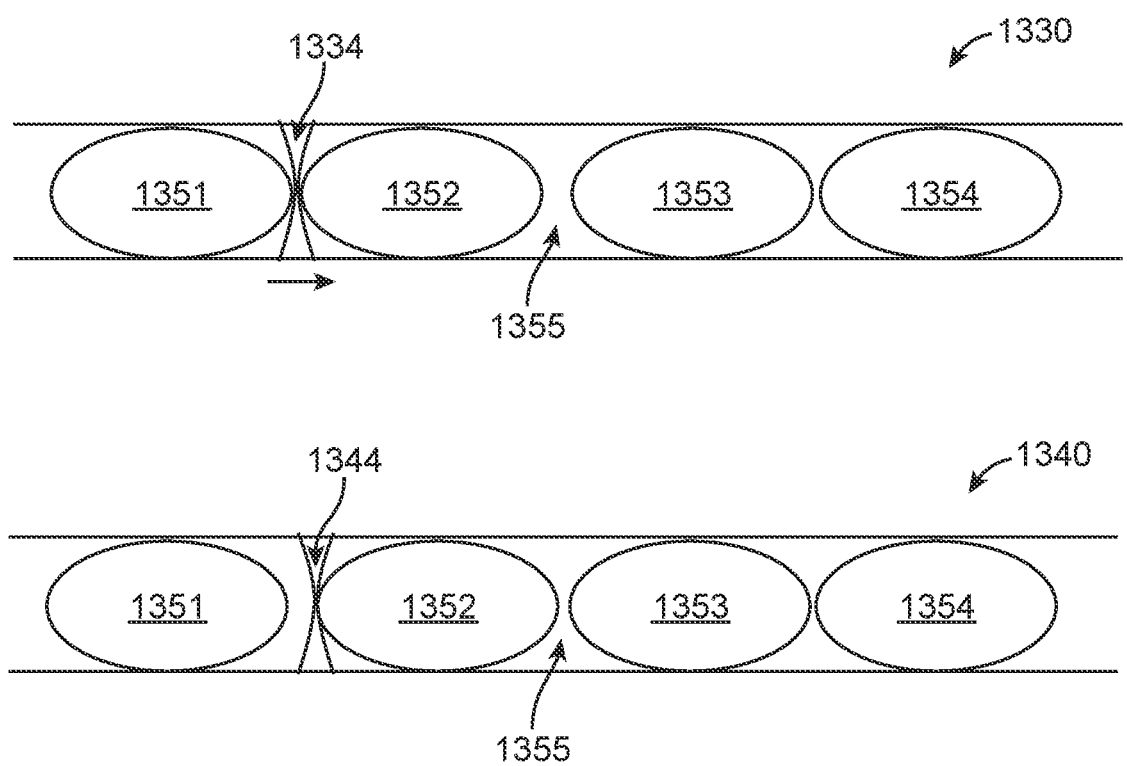
FIG. 13B illustrates an appliance with a single interproximal engagement structure positioned to span an interproximal space between teeth.

The tooth moving forces described with respect to FIG. 13A can be applied not only with a plurality of interproximal engagement structures but also by individual interproximal engagement structures. For example, FIG. 13B illustrates an appliance 1330 with a single interproximal engagement structure 1334 positioned to span an interproximal space between teeth 1351 and 1352. The interproximal engagement structure 1334 is positioned such that it applies a force on tooth 1352 to urge the tooth in a desired direction; for example, into space 1355. The appliance can apply the tooth moving force based on an anchoring by one or more tooth receiving cavities located elsewhere on the appliance, for example, as illustrated in FIG. 8B. The anchors can optionally include respective interproximal engagement structures. A sequence of aligners can continue urging tooth 1352 along a desired trajectory by repositioning the interproximal engagement structure to account for the intervening motion of the teeth. As discussed above with respect to FIG. 13A, the movement of tooth 1352 can also remove forces between tooth 1352 and 1351, resulting in both teeth shifting into better alignment.

Figure 13C:
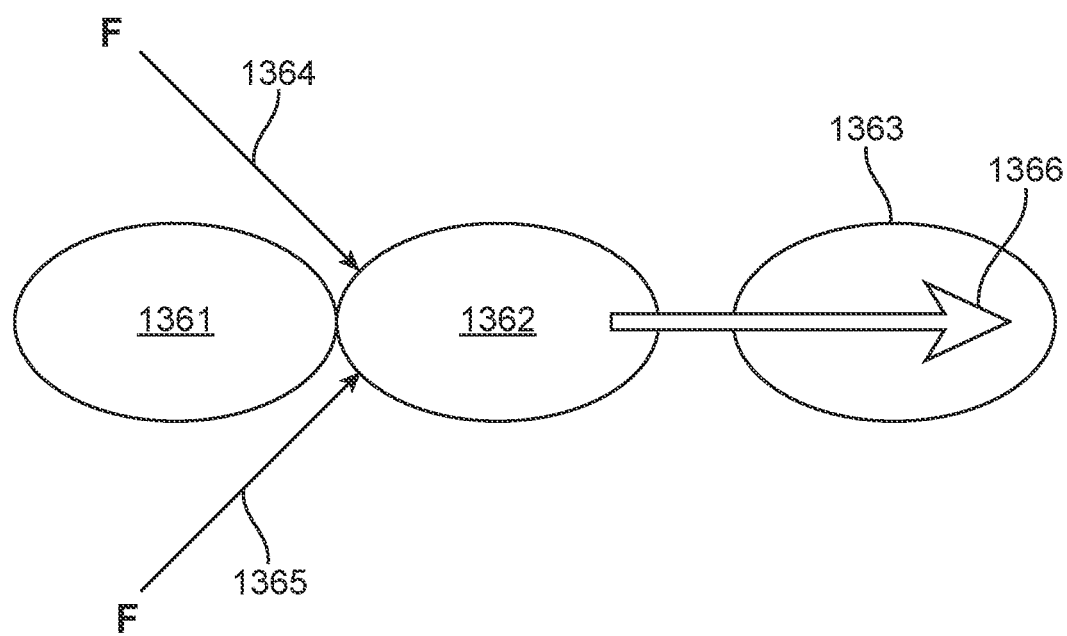
FIG. 13C illustrates an arrangement in which a plurality of forces are applied to a tooth by interproximal engagement structures to provide a resultant tooth moving force.

Although interproximal engagement structures such as structures 1334 and 1344 can apply forces across the surface of a tooth in some cases, in other cases interproximal engagement structures can engage interproximal regions of teeth in a plurality of locations to apply a plurality of forces, thereby generating a net force and/or a net moment to cause a tooth movement. For example, FIG. 13C illustrates a plurality of teeth 1361, 1362, and 1363, in which an appliance comprises one or more interproximal engagement structures to engage tooth 1362 so as to urge it in a mesiodistal direction toward tooth 1363. A plurality of forces are generated by contact of the one or more interproximal engagement structures on the surface of tooth 1362. A first force 1364 on the lingual side urges tooth 1362 in both a buccal and a mesiodistal direction, while a second force 1365 urges the tooth 1362 in both a lingual and a mesiodistal direction. The buccal and lingual components of the plurality of forces cancel either partly or completely, while the mesiodistal forces add to generate a resultant force 1366 to urge the tooth 1362 in a mesiodistal direction towards tooth 1363. Thus, for example, the tooth moving forces and moments described herein can be generated as a resultant force of two or more tooth moving forces or moments.

The direct fabrication techniques such as additive manufacturing described herein are particularly useful for the production of interproximal structures, as such structures can be produced with properties not available through prior techniques such as indirect fabrication. For example, the interproximal gaps of teeth are narrow, and accordingly interproximal structures shaped to fit in such gaps should be sufficiently thin to fit. Interproximal engagement structures also often require sharply-curved surfaces with small radii of curvature. Polymeric appliances manufactured according to prior techniques, for example, were limited in the available radius of curvature, wherein the radius of curvature of a part of the appliance was constrained by the thickness of the material. This constraint was especially relevant with regard to force-applying portions of an appliance, such as those used in the interproximal engagement structures described herein. For example, in contrast to prior polymeric appliances, the appliances disclosed herein, and manufactured according to the methods disclosed herein, can produce structures, including tooth-engaging structures, in which the radius of curvature is less than one-third of the thickness of the structure.

Figure 14:
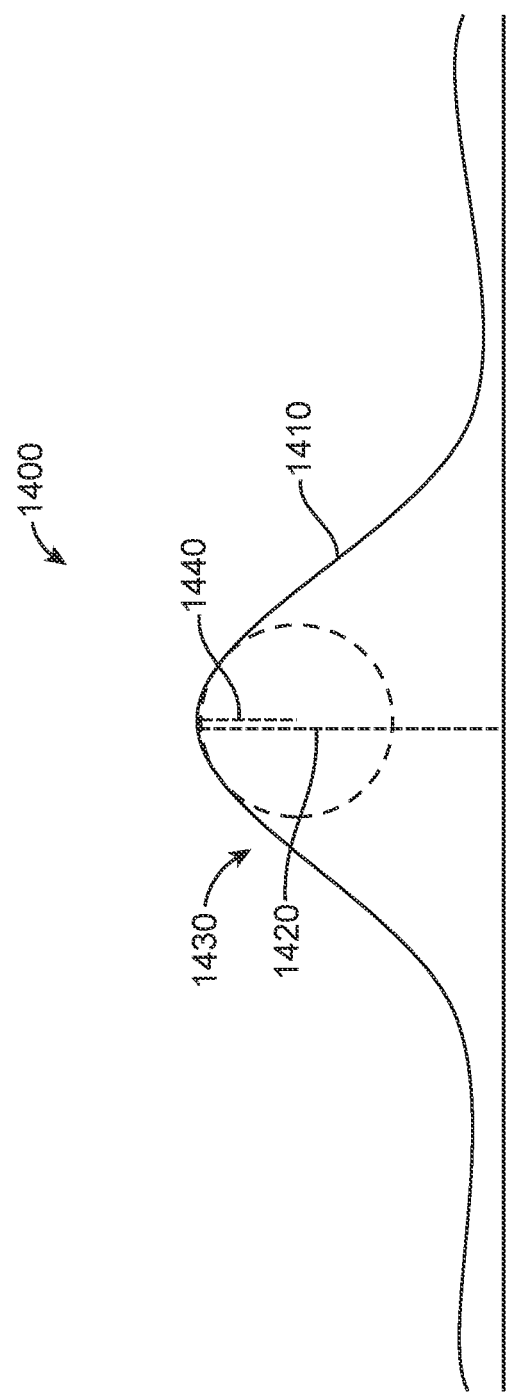
FIG. 14 illustrates an exemplary structure usable in an appliance having interproximal engagement structures, the structure having a protrusion with a radius of curvature less than a third of its thickness.

FIG. 14 illustrates an exemplary structure 1400 with a protrusion 1430 having a radius of curvature 1440. The structure also comprises a thickness 1420, such that the radius of curvature 1440 is less than 30 percent of the thickness 1420. This allows protrusion 1430 to extend into spaces such as interproximal gaps and apply forces in a way not available with prior apparatus. In some embodiments, a protrusion such as protrusion 1430 can extend from a shell to engage a tooth surface, at the apex or the sides of the protrusion, for example. Additionally or alternatively, the protrusions can extend from other structures; for example, a first protrusion can extend from a second protrusion or other structure to contact a tooth surface. In some cases, protrusions can extend away from a tooth surface as well, such as a protrusion located on an outer surface of an appliance. Further structures with smaller radii of curvature can be manufactured as needed, with radius of curvature less than 20 percent, less than 10 percent, or even less than 5 percent of the thickness of the material, thus allowing appliance material to extend into dental regions not previously accessible. Although structure 1400 is shown as a convex structure, it will be understood that analogous concave structures can be produced with radii of curvature less than 30 percent, less than 20 percent, less than 10 percent, or even less than 5 percent of their respective thicknesses, thereby allowing tooth-receiving cavities comprising tight envelopment even of sharp dental structures, for example.

The improved limits provided by direct fabrication with regard to thickness and radius of curvature allow the fabrication of appliances with surfaces that closely match the surface of a patient's tooth, thereby improving the engagement of said surfaces. For example, an engagement surface—such as an interproximal engagement surface, a tooth receiving cavity, or an occlusal surface, for example—can be fabricated with a shape to match the shape of irregularities of the surface of the tooth to be engaged. For example, irregularities as small as 100 microns or less can be matched by fabricating a corresponding engagement surface with corresponding irregularities (such as protrusions and pockets, for example) having a resolution of 100 microns or better. Such irregularities have a correspondingly small radius of curvature. Prior polymeric appliances have been limited in this respect, as such small structures required proportionally thin materials with lower load-bearing capacity. The methods and appliances disclosed herein, by contrast, allow the fabrication of such structures without being limited by the thickness of the material on which such structures are deposited.

Each of the structures disclosed herein, including those structures depicted in FIGS. 1, 2, and 5-15, can be incorporated, individually or in combination, into an appliance such as a polymeric shell appliance. The interproximal engagement structures disclosed herein can in particular be formed from polymeric material as part of such appliances. Such appliances can be manufactured using direct fabrication techniques as disclosed herein, for example, such as additive manufacturing.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of dental treatment planning, the method comprising:
    determining a movement path to move one or more teeth of a patient from an initial arrangement to a target arrangement;
    determining an appliance geometry for a first orthodontic appliance and a second orthodontic appliance configured to be sequentially worn by the patient to move the one or more teeth along the movement path, wherein the appliance geometry for the first orthodontic appliance and the second orthodontic appliance comprises:
       a buccal sidewall,
       a lingual sidewall,
       a first polymeric interproximal engagement structure extending from the buccal sidewall into a space at a first side of an interproximal region between a first tooth and a second tooth, the first polymeric interproximal engagement structure configured to contact the first tooth and the second tooth concurrently, and
       a second polymeric interproximal engagement structure extending from the lingual sidewall into a space at a second side of the interproximal region between the first tooth and the second tooth, the second polymeric interproximal engagement structure configured to contact the first tooth and the second tooth concurrently,
    wherein the first polymeric interproximal engagement structure and the second polymeric interproximal engagement structure of the first orthodontic appliance are not joined to each other in the interproximal region,
    wherein at least one of the first polymeric interproximal engagement structure or the second polymeric interproximal engagement structure of the first orthodontic appliance is larger than the corresponding space of the interproximal region, such that the contact between the at least one polymeric interproximal engagement structure and the first and second teeth causes deformation of the at least one polymeric interproximal engagement structure or the corresponding buccal or lingual sidewall, and
    wherein at least one of the first polymeric interproximal engagement structure or the second polymeric interproximal engagement structure of the first orthodontic appliance has a different geometry than at least one of the first polymeric interproximal engagement structure or the second polymeric interproximal engagement structure of the second orthodontic appliance; and
    fabricating the first orthodontic appliance and the second orthodontic appliance based on the determined appliance geometry, wherein the first polymeric interproximal engagement structure and the second polymeric interproximal engagement structure of at least one of the first orthodontic appliance or the second orthodontic appliance are fabricated from a first material having a first stiffness, and the buccal sidewall and the lingual sidewall of the at least one of the first orthodontic appliance and the second orthodontic appliance are fabricated from a second material having a second stiffness different from the first stiffness.

2. The method of claim 1, wherein fabricating the first orthodontic appliance and the second orthodontic appliance comprises direct fabrication.

3. The method of claim 1, wherein fabricating the first orthodontic appliance and the second orthodontic appliance comprises forming an integral body for the at least one of the first orthodontic appliance or the second orthodontic appliance from the first and second materials.

4. The method of claim 1, further comprising determining one or more forces to produce the movement pattern.

5. The method of claim 4, wherein the appliance geometry is determined based on the one or more forces.

6. The method of claim 1, wherein the first orthodontic appliance and the second orthodontic appliance are part of a plurality of orthodontic appliances configured to move the patient's teeth from the initial arrangement to the target arrangement.

7. The method of claim 1, wherein the first orthodontic appliance and the second orthodontic appliance are part of a plurality of orthodontic appliances configured to successively increase a width of the interproximal region.

8. The method of claim 1, wherein the appliance geometry of at least one of the first orthodontic appliance or the second orthodontic appliance is determined such that at least one of the first polymeric interproximal engagement structure or the second polymeric interproximal engagement structure is configured to provide a counter moment.

9. The method of claim 1, wherein the appliance geometry of at least one of the first orthodontic appliance or the second orthodontic appliance is determined such that at least one of the first polymeric interproximal engagement structure or the second polymeric interproximal engagement structure is configured to provide anchorage of the at least one of the first orthodontic appliance or the second orthodontic appliance to the patient's teeth.

10. The method of claim 1, wherein a distance between the first polymeric interproximal engagement structure and the second polymeric interproximal engagement structure of the first orthodontic appliance is greater than a distance between the first polymeric interproximal engagement structure and the second polymeric interproximal engagement structure of the second orthodontic appliance.

11. The method of claim 1, wherein a distance between the first polymeric interproximal engagement structure and the second polymeric interproximal engagement structure of the first orthodontic appliance is less than a distance between the first polymeric interproximal engagement structure and the second polymeric interproximal engagement structure of the second orthodontic appliance.

12. The method of claim 1, wherein an angle of at least one of the first polymeric interproximal engagement structure or the second polymeric interproximal engagement structure of the first orthodontic appliance is different than an angle between at least one of the first polymeric interproximal engagement structure or the second polymeric interproximal engagement structure of the second orthodontic appliance.

13. The method of claim 1, wherein a position of at least one of the first polymeric interproximal engagement structure or the second polymeric interproximal engagement structure of the first orthodontic appliance is different than a position of at least one of the first polymeric interproximal engagement structure or the second polymeric interproximal engagement structure of the second orthodontic appliance.

14. The method of claim 1, wherein the first stiffness is greater than the second stiffness.

15. The method of claim 1, wherein the second stiffness is greater than the first stiffness.

16. A computer-implemented method for dental treatment planning, the computer-implemented method comprising:
  determining, by a processor, a movement path to move one or more teeth of a patient from an initial arrangement to a target arrangement;
  determining, by the processor, an appliance geometry for a first orthodontic appliance and a second orthodontic appliance configured to be sequentially worn by the patient to move the one or more teeth along the movement path, wherein the appliance geometry for the first orthodontic appliance and the second orthodontic appliance comprises:
    a buccal sidewall,
    a lingual sidewall,
    a first polymeric interproximal engagement structure extending from the buccal sidewall into a space at a first side of an interproximal region between a first tooth and a second tooth, the first polymeric interproximal engagement structure configured to contact the first tooth and the second tooth concurrently, and
    a second polymeric interproximal engagement structure extending from the lingual sidewall into a space at a second side of the interproximal region between the first tooth and the second tooth, the second polymeric interproximal engagement structure configured to contact the first tooth and the second tooth concurrently,
    wherein the first polymeric interproximal engagement structure and the second polymeric interproximal engagement structure of the first orthodontic appliance are not joined to each other in the interproximal region, and
    wherein at least one of the first polymeric interproximal engagement structure or the second polymeric interproximal engagement structure of the first orthodontic appliance is larger than the corresponding space of the interproximal region, such that the contact between the at least one polymeric interproximal engagement structure and the first and second teeth causes deformation of the at least one polymeric interproximal engagement structure or the corresponding buccal or lingual sidewall, and
    wherein at least one of the first polymeric interproximal engagement structure or the second polymeric interproximal engagement structure of the first orthodontic appliance has a different geometry than at least one of the first polymeric interproximal engagement structure or the second polymeric interproximal engagement structure of the second orthodontic appliance; and
  causing fabrication of the first and the second orthodontic appliances, wherein the fabrication of the first orthodontic appliance and the second orthodontic appliance comprises direct fabrication, and wherein the first polymeric interproximal engagement structure and the second polymeric interproximal engagement structure of at least one of the first orthodontic appliance or the second orthodontic appliance are fabricated from a first material having a first stiffness, and the buccal sidewall and the lingual sidewall of the at least one of the first orthodontic appliance and the second orthodontic appliance are fabricated from a second material having a second stiffness different from the first stiffness.

17. The computer-implemented method of claim 16, wherein the fabrication is caused by transmitting instructions to a fabrication system.

18. The computer-implemented method of claim 17, wherein the fabrication system is at a remote location from the processor.

19. The computer-implemented method of claim 16, wherein the fabrication comprises forming an integral body for the at least one of the first orthodontic appliance or the second orthodontic appliance from the first and second materials.

20. The computer-implemented method of claim 16, further comprising determining one or more forces to produce the movement path.

21. The computer-implemented method of claim 20, wherein the appliance geometry is determined based on the one or more forces.

22. The computer-implemented method of claim 16, wherein the first orthodontic appliance and the second orthodontic appliance are part of a plurality of orthodontic appliances configured to move the patient's teeth from the initial arrangement to the target arrangement.

23. The computer-implemented method of claim 16, wherein the appliance geometry of at least one of the first orthodontic appliance or the second orthodontic appliance is determined such that at least one of the first polymeric interproximal engagement structure or the second polymeric interproximal engagement structure is configured to provide a counter moment.

24. The computer-implemented method of claim 16, wherein the appliance geometry of at least one of the first orthodontic appliance or the second orthodontic appliance is determined such that at least one of the first polymeric interproximal engagement structure or the second polymeric interproximal engagement structure is configured to provide anchorage of the at least one of the first orthodontic appliance or the second orthodontic appliance to the patient's teeth.

* * * * *